US012148022B2

(12) United States Patent
Ferguson et al.

(10) Patent No.: US 12,148,022 B2
(45) Date of Patent: Nov. 19, 2024

(54) CONSUMER PURCHASING AND INVENTORY CONTROL ASSISTANT APPARATUS, SYSTEM AND METHODS

(71) Applicant: TACO MARKETING LLC, Fort Meyers, FL (US)

(72) Inventors: Todd B. Ferguson, Fort Myers, FL (US); Andrew M. Czachowski, Greenfield, WI (US)

(73) Assignee: TACO Marketing LLC, Fort Myers, FL (US)

( * ) Notice: Subject to any disclaimer, the term of this patent is extended or adjusted under 35 U.S.C. 154(b) by 0 days.

(21) Appl. No.: 16/932,355

(22) Filed: Jul. 17, 2020

(65) Prior Publication Data

US 2021/0019813 A1 Jan. 21, 2021

Related U.S. Application Data

(60) Provisional application No. 62/875,895, filed on Jul. 18, 2019.

(51) Int. Cl.
*G06Q 30/0601* (2023.01)
*G06F 3/0482* (2013.01)
(Continued)

(52) U.S. Cl.
CPC ....... *G06Q 30/0635* (2013.01); *G06F 16/951* (2019.01); *G06F 40/205* (2020.01); *G06Q 10/0875* (2013.01); *G06Q 10/107* (2013.01); *G06Q 30/0206* (2013.01); *G06Q 30/04* (2013.01); *G06Q 40/12* (2013.12); *H04L 51/08* (2013.01); *H04L 51/42* (2022.05); *G06F 3/0482* (2013.01)

(58) Field of Classification Search
CPC .............. G06Q 30/0635; G06Q 40/12; G06Q 10/0875; G06Q 10/107; G06Q 30/0206; G06Q 30/04; G06F 16/951; G06F 40/205; G06F 3/0482; H04L 51/08; H04L 51/22
USPC ...................................................... 705/7.35
See application file for complete search history.

(56) References Cited

U.S. PATENT DOCUMENTS

| 6,076,104 | A | * | 6/2000 | McCue | ................. | G06F 16/748 |
| | | | | | | 707/E17.112 |
| 6,639,156 | B2 | | 10/2003 | Luke | | |

(Continued)

FOREIGN PATENT DOCUMENTS

| EP | 1024448 A2 * | 8/2000 | ............. G06Q 30/06 |
| WO | 2000072213 | 11/2000 | |

(Continued)

OTHER PUBLICATIONS

International Search Report issued in PCT Patent Application No. PCT/US2018/034409; Oct. 18, 2018, 3 pages.

(Continued)

*Primary Examiner* — Abdallah A El-Hage Hassan
(74) *Attorney, Agent, or Firm* — Fitch, Even, Tabin & Flannery LLP

(57) ABSTRACT

A method for purchasing goods comprising receiving a document listing one or more goods to be purchased, acquiring prices for the good from a plurality of sellers, acquiring at least one price for a comparable good from at least one seller, identifying a best price of the acquired prices, and outputting the best price.

23 Claims, 24 Drawing Sheets

(51) Int. Cl.
  *G06F 16/951*      (2019.01)
  *G06F 40/205*      (2020.01)
  *G06Q 10/0875*     (2023.01)
  *G06Q 10/107*      (2023.01)
  *G06Q 30/0201*     (2023.01)
  *G06Q 30/04*       (2012.01)
  *G06Q 40/12*       (2023.01)
  *H04L 51/08*       (2022.01)
  *H04L 51/42*       (2022.01)

(56) References Cited

U.S. PATENT DOCUMENTS

| | | | |
|---|---|---|---|
| 7,107,226 B1 | 9/2006 | Cassidy | |
| 7,577,582 B1* | 8/2009 | Ojha | G06Q 30/06 |
| | | | 705/26.41 |
| 7,676,404 B2 | 3/2010 | Richard | |
| 8,229,802 B2 | 7/2012 | Henry | |
| 8,326,697 B2* | 12/2012 | Kopelman | G06Q 30/0601 |
| | | | 705/26.1 |
| 8,543,480 B2* | 9/2013 | Mueller | G06Q 10/06 |
| | | | 705/37 |
| 8,612,276 B1* | 12/2013 | Nielsen | G06Q 10/063118 |
| | | | 705/7.22 |
| 9,990,597 B2 | 6/2018 | He | |
| 10,025,759 B2* | 7/2018 | Mulder | G06F 17/10 |
| 10,318,917 B1 | 6/2019 | Goldstein | |
| 10,574,794 B1* | 2/2020 | Minh | H04L 69/08 |
| 10,672,062 B2 | 6/2020 | Higgins | |
| 10,956,855 B1 | 3/2021 | Coughran | |
| 11,030,571 B2 | 6/2021 | Glasgow | |
| 11,851,279 B1 | 12/2023 | Chinoy | |
| 2001/0034671 A1 | 10/2001 | Luke | |
| 2002/0152139 A1 | 10/2002 | Hogan | |
| 2002/0156702 A1* | 10/2002 | Kane | G06Q 30/0641 |
| | | | 705/27.1 |
| 2002/0184102 A1 | 12/2002 | Markopoulos | |
| 2004/0138962 A1* | 7/2004 | Kopelman | G06Q 30/0613 |
| | | | 705/26.62 |
| 2004/0199435 A1* | 10/2004 | Abrams | G06Q 30/06 |
| | | | 705/27.2 |
| 2005/0049942 A1 | 3/2005 | Richard | |
| 2005/0075949 A1 | 4/2005 | Uhrig | |
| 2005/0114235 A1 | 5/2005 | Snyder | |
| 2005/0160014 A1* | 7/2005 | Moss | G06Q 30/0259 |
| | | | 705/26.61 |
| 2005/0160115 A1 | 7/2005 | Starkweather | |
| 2007/0276880 A1* | 11/2007 | Lu | G06Q 30/0214 |
| | | | 707/999.203 |
| 2009/0222359 A1 | 9/2009 | Henry | |
| 2009/0254447 A1* | 10/2009 | Blades | G06Q 30/0601 |
| | | | 705/40 |
| 2009/0294469 A1 | 12/2009 | Poulain | |
| 2010/0121752 A1* | 5/2010 | Banigan | G06Q 40/04 |
| | | | 705/37 |
| 2010/0256994 A1* | 10/2010 | Eisenberger | G16H 40/67 |
| | | | 726/30 |
| 2011/0295783 A1* | 12/2011 | Zhao | G06F 16/337 |
| | | | 706/12 |
| 2011/0301749 A1 | 12/2011 | Hammonds | |
| 2012/0089480 A1* | 4/2012 | Fusz | G06Q 30/06 |
| | | | 705/27.1 |
| 2012/0197695 A1* | 8/2012 | Kopelman | G06Q 30/0643 |
| | | | 705/14.1 |
| 2013/0018724 A1 | 1/2013 | Winslade | |
| 2014/0122228 A1* | 5/2014 | Wical | G06Q 30/02 |
| | | | 705/14.53 |
| 2014/0214547 A1 | 7/2014 | Signorelli | |
| 2014/0351695 A1* | 11/2014 | Xing | G06F 40/103 |
| | | | 715/243 |
| 2015/0186978 A1 | 7/2015 | Prindle | |
| 2015/0186982 A1 | 7/2015 | Higgins | |
| 2016/0104229 A1* | 4/2016 | Craft | G06Q 30/0641 |
| | | | 705/26.7 |
| 2016/0132821 A1 | 5/2016 | Glasgow | |
| 2016/0148236 A1* | 5/2016 | Evdokimo | G06Q 30/08 |
| | | | 705/26.3 |
| 2016/0171586 A1* | 6/2016 | Jung | G06Q 20/12 |
| | | | 705/26.63 |
| 2016/0259344 A1* | 9/2016 | High | H04B 10/116 |
| 2016/0283881 A1 | 9/2016 | He | |
| 2017/0017646 A1* | 1/2017 | Kumar | G06F 21/00 |
| 2017/0109687 A1* | 4/2017 | Kamadolli | G06Q 30/0201 |
| 2017/0293881 A1 | 10/2017 | Narkulla | |
| 2019/0066216 A1* | 2/2019 | Teixeira | G06Q 10/063 |
| 2019/0087769 A9 | 3/2019 | Glasgow | |
| 2019/0295099 A1 | 9/2019 | Wilkinson | |
| 2020/0175464 A1* | 6/2020 | Ferguson | G06Q 30/0601 |
| 2021/0019813 A1 | 1/2021 | Ferguson | |

FOREIGN PATENT DOCUMENTS

| | | |
|---|---|---|
| WO | 2015095493 | 6/2015 |
| WO | 2016161483 | 10/2016 |

OTHER PUBLICATIONS

Patent Cooperation Treaty, International Search Report issued in International App. No. PCT/US2022/029233, Oct. 5, 2022, 4 pp.
Patent Cooperation Treaty, International Searching Authority, Written Opinion of the International Searching Authority issued in International Application No. PCT/US2022/029233, Oct. 5, 2022, 5 pp.
USPTO; U.S. Appl. No. 17/847,097; Non-Final Rejection mailed Oct. 17, 2023; (pp. 1-18).
USPTO; U.S. Appl. No. 17/847,097; Notice of Allowance and Fees Due (PTOL-85) mailed Feb. 15, 2024; (pp. 1-12).

* cited by examiner

FIG. 5

| Part | Description | Qty | List Price | Best Price | Updated | |
|---|---|---|---|---|---|---|
| ASF236W9USZ | Targus Privacy Screen 23" Widescreen (16:9... | 2 | $ 116.00 | $ 90.10 (New) | 3 minutes ago | Cart / Group |
| ASF24WUSZ | Targus 24" Widescreen LCD Monitor Privacy... | 1 | $ 116.00 | $ 47.00 (New) | 3 minutes ago | Cart / Group |
| ASF215W9USZ | Targus 21.5" Widescreen LCD Monitor Privac... | 5 | $ 104.00 | $ 70.64 (New) | 3 minutes ago | Cart / Group |
| ASF13MBPUSZ | Targus Privacy Screen notebook privacy fil... | 1 | $ 45.00 | $ 25.23 (New) | 3 minutes ago | Cart / Group |
| ASF236W9USZ | Targus 23.6" Widescreen Privacy Screen (16... | 1 | $ 86.00 | $ 78.24 (New) | 3 minutes ago | Cart / Group |

FRED
- Dashboard
- Profile
- Documents
- Group Buys
- Items

Andrew Czachowski

Check it out, you could save $398.13

Your quote from SHI is 29.51% higher

This Data is Subject to Change over time

☐ Livequote
☐ Concierge
☐ Group Buy

| FRED | | 🔍 Search here..... | | 📢 👤 Joe Rep ▾ |
|---|---|---|---|---|
| Dashboard | Your Documents | | | ⟳ ⌄ |
| Profile | Create | Reference | Total Value | Responses |
| Documents › | 2017-03-02 10:32:10 | 1BQ52KG.pdf | 1288.95 | 🗄 Bid |
| Group Buys | 2017-03-02 07:49:32 | Quotation #0218616179-ESRIG LLC.PDF | 1231.01 | 🗄 Bid |
| Items | 2017-03-02 11:56:08 | SHI Quote-12841821.pdf | 1363 | 🗄 Bid |
| | 2017-03-02 12:09:13 | Computer Build | 163.07 | 🗄 Bid |

| 📄 PCM Sales Mutual NDA….pdf ▾ | ⬇ Show All | ✕ |

FIG. 6

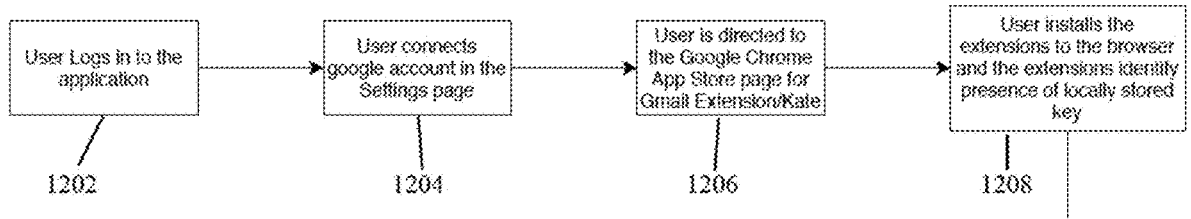
FIG. 12A
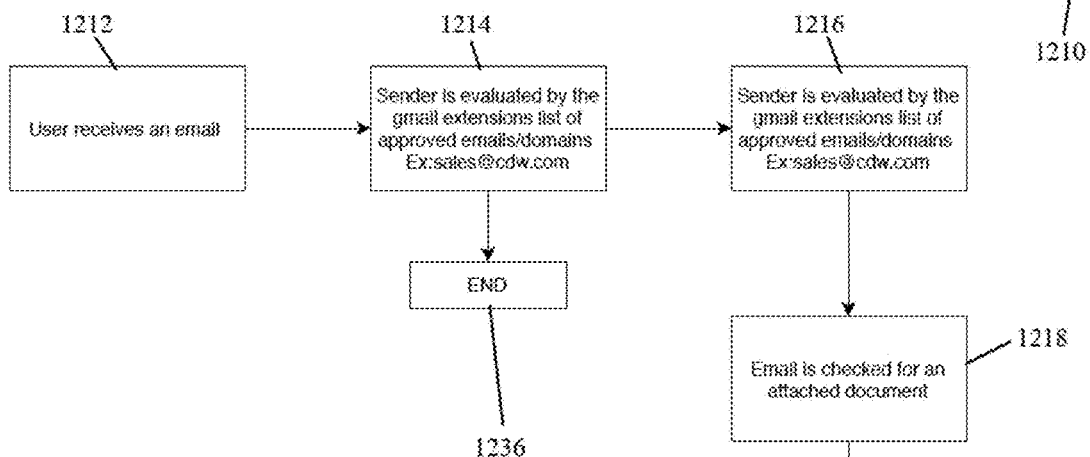
FIG. 12B
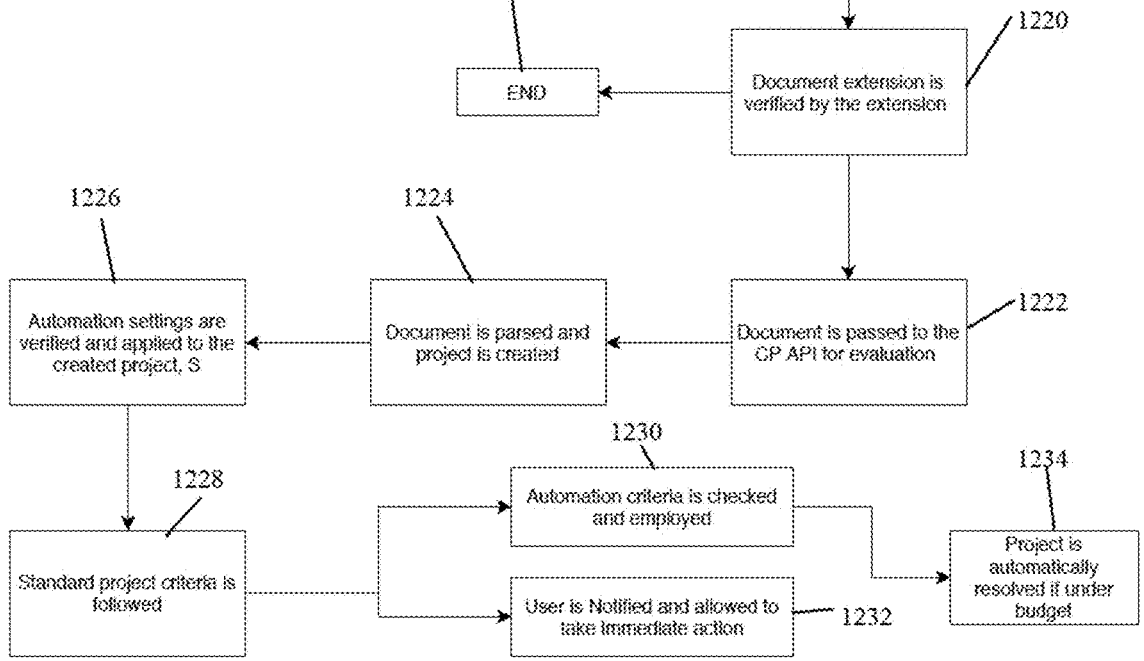

CONSUMER PURCHASING AND INVENTORY CONTROL ASSISTANT APPARATUS, SYSTEM AND METHODS

CROSS REFERENCE TO RELATED APPLICATIONS

This application claims the benefit of U.S. Provisional Application No. 62/875,895, filed Jul. 18, 2019, and is incorporated herein by reference in its entirety.

TECHNICAL FIELD

This invention relates generally to consumer purchasing and, more particularly, apparatus and systems for online purchasing and methods relating thereto.

BACKGROUND

E-commerce is becoming an increasingly popular way for consumers to purchase all kinds of goods. While it has long been common to purchase specialty goods online, many online stores are expanding into common household goods, such as groceries and toiletries. However, with so many online stores offering the same goods and each of those stores having dynamic prices, it can be difficult for a consumer to find the best deal. Additionally, many stores or sellers offer better prices to bulk purchasers.

In conventional price comparison products, software or services, it is known to search the internet for a particular product by its barcode, name or other identifying indicia to locate comparable prices, however, such systems require the user to actively submit the information being searched and/or they fail to recognize standard forms (e.g., estimates, purchase orders, invoices, proposals, etc.). In addition, conventional systems can easily be thwarted by changing the location of certain data on a form to prevent the form from being machine readable or recognizable due to a change from a prior format. Conventional systems typically rely on manual data entry from users to determine what products are being searched for. However, this data is already present on purchase orders, request form, existing quotes, or some other piece of documentation.

Conventional inventory control systems have similar shortcoming where they require the user to actively submit the information being stocked and manually update the inventory as the items are moved or used. When inventory runs low, the user must manually order replacements. Alternatively, the user can estimate their rate of consumption and manually create a subscription to reorder at a set rate.

Accordingly, it has been determined that the need exists for an improved consumer purchasing assistant apparatus and inventory control apparatus, system and related methods which overcomes the aforementioned limitations, and which further provides capabilities, features and functions, not available in current products, services and methods.

BRIEF DESCRIPTION OF THE DRAWINGS

FIG. 5 is a screenshot from an example system for assisting in consumer purchasing;

FIG. 6 is a screenshot from an example system for assisting in consumer purchasing;

FIGS. 12A-12B are flow diagrams of an apparatus, system and/or method for assisting in consumer purchasing;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, a system is provided for assisting consumer purchasing. An example system receives an input, such as a purchase order, invoice, or other document, indicating a desired product or list of products. This list is parsed, and the system identifies online listings of the products for sale and identifies the cheapest. The system additionally searches for sales, coupons, group buy opportunities, and other means of decreasing the sale price. In one form, the system maintains a list of desired products, and periodically performs another search to identify the cheapest seller. When the cheapest price drops, the user is notified. In another form, the system forms a group comprising a plurality of users who desire the same product in order to form a bulk purchase. The users are informed of the current size of the group and the required size in order to qualify for the group buy discount. The users are periodically updated as the group grows until it reaches the purchase size.

Figure 1A:
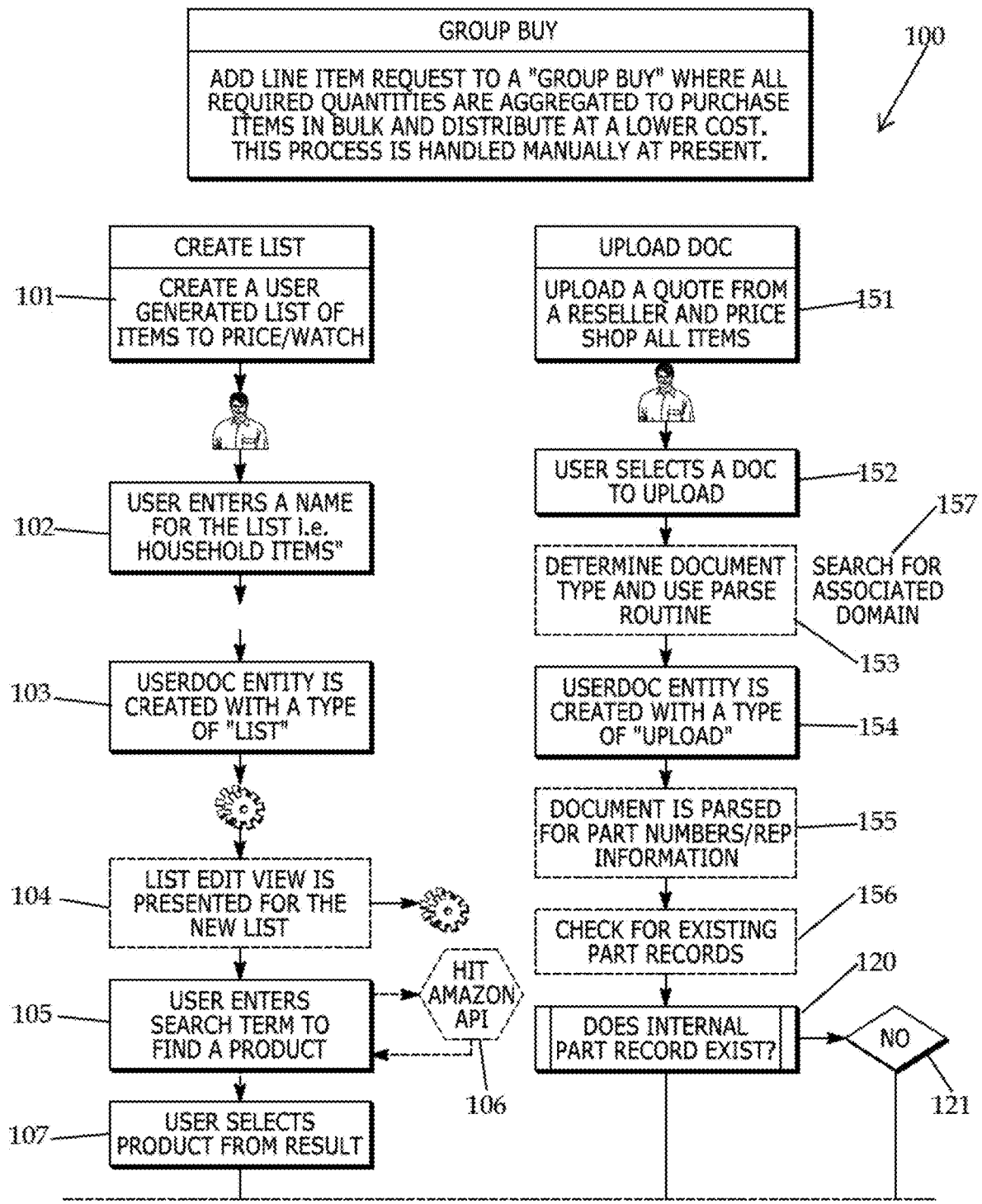
FIGS. 1A-1B show a flow diagram of an apparatus, system and/or method for assisting in consumer purchasing.
Figure 1B:
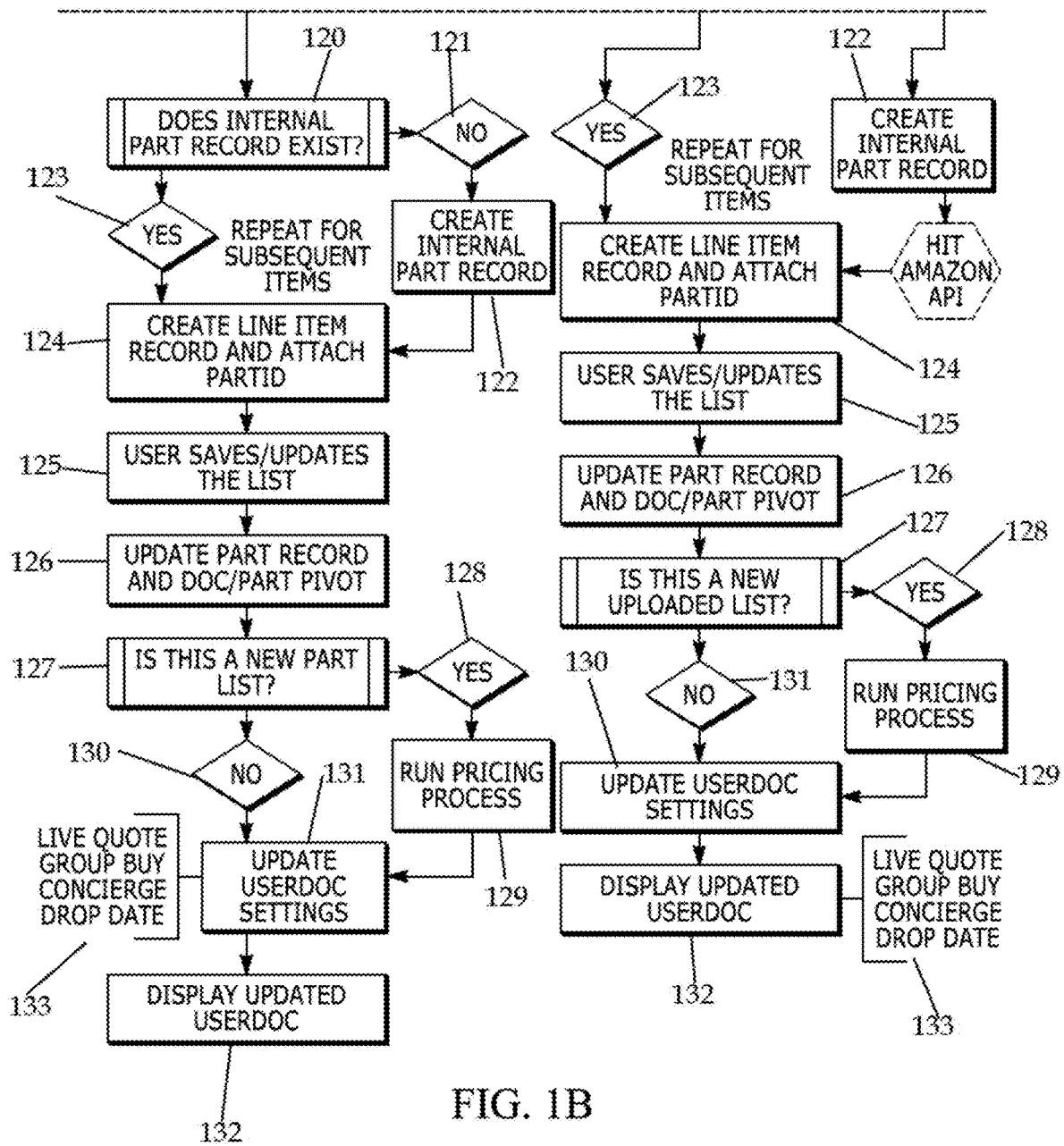
Figure 3:
FIG. 3 is a screenshot from an example apparatus, system and/or method for assisting in consumer purchasing.

FIGS. 1A-1B illustrate a flow chart of the group buy process 100. To start, the user can either upload a document having a list or start a new list on the system from the dashboard, see FIG. 3. If the user opts to create 101 a list on the system, they input 102 a title for the list. The system then forms 103 a blank list which they can edit 104 by adding search terms to find the desired products. As they enter 105 the search terms, a list of available products is generated by the system from which the user selects 107 the product they are searching for. In one form, the search utilizes 106 an Amazon API gateway. This product is then added to the list. These steps are repeated until the list is fully formed.

Instead, a user may decide to upload 151 an existing list. Exemplary lists include inventory databases or price sheets from resellers. First, the user selects 152 a document to upload. The system determines the document type and then parses 153 it. In some forms, information parsed from the list is used to search 157 for an associated domain. For example, the domain of a reseller associated with the types of products identified in the parsing process or the domain of a reseller specifically identified in the uploaded document. A new document is formed 154 to store the data that is parsed from this uploaded document. The parsing 153 identifies and extracts 155 product identifying information, such as part numbers, or product names. The parsed information is then checked 156 against existing records containing lists of available products in order to form a list on the system.

Once a list is formed on the system, the system checks 120 for an internal part record of each product. For any products that do not 121 already have an internal part record, one is created 122. Once each product on the list has 123 an internal part record, a line item record is created 124 with the part ids of the products attached. The user can then save 125 the list. The list us editable, so that the user can add or remove products to it at any time. When the list is saved and updated, the system updates 126 the part record.

Figure 4:
FIG. 4 is a screenshot from an example system for assisting in consumer purchasing.

The system determines 127 if a new list or newly updated list with a new part is uploaded. If so 128, a pricing process is run 129 on the newly added products to identify the best deals, such as group buys. Regardless of whether 128 or not 130 the update included a new list or new parts, the document settings are updated 131 to reflect the update. The updated document is displayed 132 to the user. Live quotes for available groups for the products are identified 133 on a group buys page of the user portal to the system, see FIG. 4. The user can then join the groups so that they product can be purchased at the wholesale price once the group is large enough.

Figure 2A:
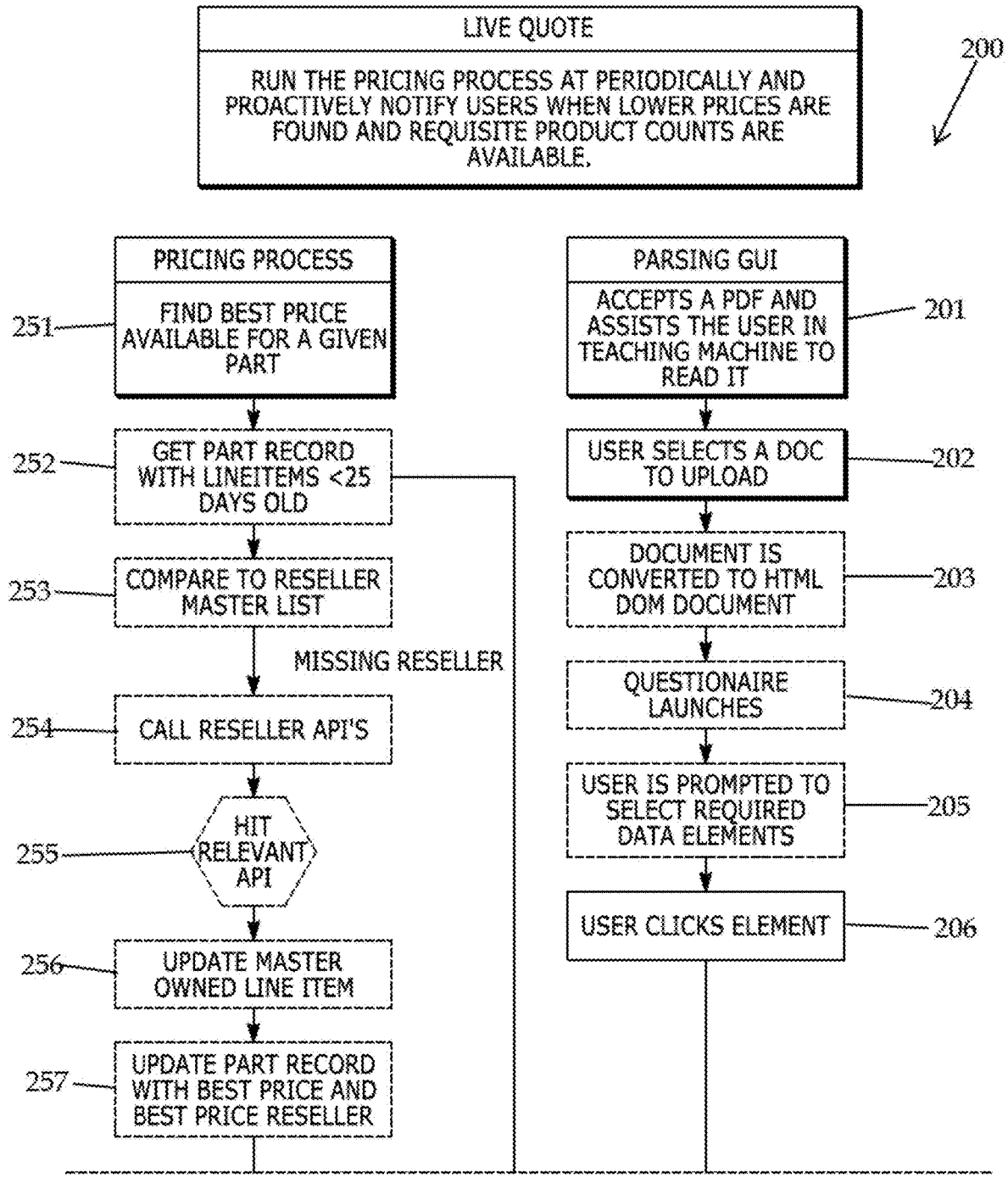
FIGS. 2A-2B show a flow diagram of an apparatus, system and/or method for assisting in consumer purchasing.
Figure 2B:
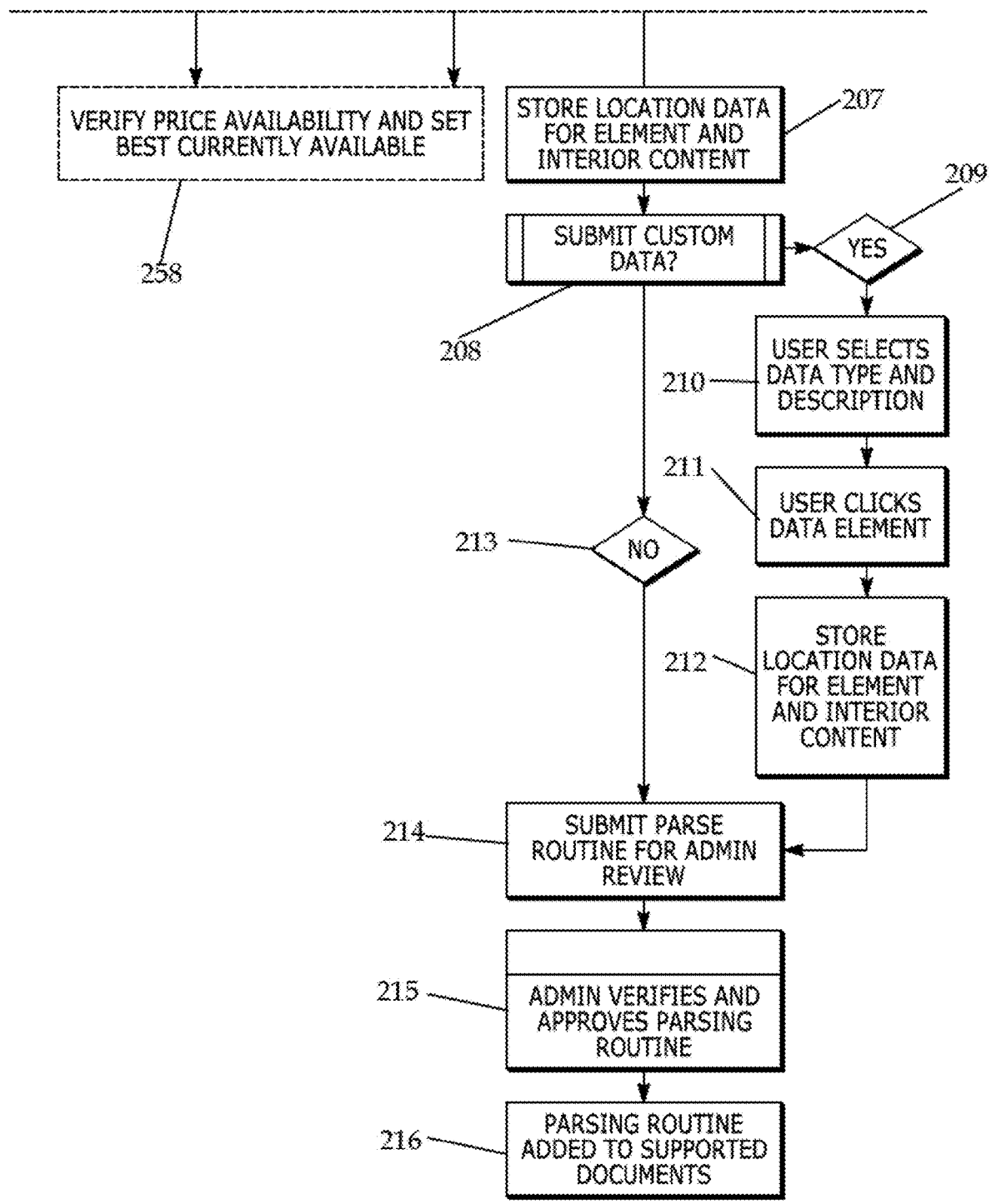

FIGS. 2A-2B are a flowchart of a process 200 for monitoring prices. The pricing process keeps a list of products desired by the user, and periodically searches available sellers to find the best price available. The process includes a parsing graphical user interface 201 which accepts a document from the user and then learns to read the document with the help of the user. As with the above process, the user can input an existing list by selecting 202 a saved document and uploading the document. In some forms, the document is automatically identified and uploaded without user input. For example, the system includes a web browser extension that monitors the user's online shopping activities and/or emails to identify purchases and attempted purchases. In some forms, the extension uploads products to the live quote system 200 as they are added to an online shopping cart, and then a live quote is provided in real time if better prices are available elsewhere.

The document is converted 203 from the uploaded document type, such as a PDF, to a HTML document. The system then parses the document to identify the listed products. In one form, parsing involves asking the user questions to help identify the products. The questions are displayed 204 via the user portal and the answers are input by the user. Specifically, the user is prompted 205 to select the required data elements from the document. As the required elements are listed, such as part number, quantity, etc., the user clicks 206 on where the element is located on the document. The data parsed form the clicked portion of the document is stored 207 in a portion of memory associated with that element. If the product cannot be identified by the automated questionnaire, the user can input custom data to help identify the product. The custom data is reviewed by a system admin to identify the products. To utilize custom data, the system first determines 208 if custom data is needed. If so 209, the user selects 210 the data type and description from a list. The user then clicks 211 on the data element corresponding to the selected data type. The system stores 212 the location data within the document of the data element.

After the data is all entered, regardless of whether 209 or not 213 custom data was required, the parse routine is submitted 214 for review by a system administrator. The administrator verifies and approves 215 the parsing routine, at which point it is added 216 to the supported document. Adding 216 the parsing routine to the supported documents, allows future documents of that type to be parsed automatically without the need for user inputs through a questionnaire or custom data.

The system crawls the web to identify 251 the best prices available for listed products. This includes searching the list price for sellers and resellers as well as identifying sales literature, coupons, and other price reducing means. In some forms, other methods of acquiring price information is used in addition to or instead of crawling the web. For example, a plurality of users upload documents having bid prices provided by resellers. The bid prices are parsed by the system and listed in the best price record, allowing the system to find prices even better than any publicly available on the internet.

For any price identified that is determined 252 to be less than a predetermined age, such as 25 days old (in other embodiments the age can be altered from 25 days to another length), the price is compared 253 to the master list of sellers kept by the system. If the reseller is already on the system, the price is updated in the master list. If the reseller is not in the system, the reseller is contacted 254 via the API. Contacting the reseller via the API involves first identifying 255 the correct API. The new reseller can then be added 256 to the master list. The master list is updated 257 to reflect the new best price and best price reseller. The master list prices are used to display the best available price to the user.

The system periodically runs this pricing process in order to identify the best deals for purchasing the listed products as well as to verify 258 the availability of the best price item. The prices are displayed to the user on the created list, see FIG. 6. In some forms, the user can identify a purchase price. Once the list price drops to or below the pre-identified purchase price, the products are automatically purchased in a predetermined quantity. The system additionally informs the user of any group buy opportunities for items on the list.

In addition to the methods of finding prices described above, the pricing process 251 in some forms includes a bidding process. A document containing the identity and quantity of products desired by the user are submitted to a number of resellers, distributors, or other representatives collectively known as concierge representatives. The concierge representatives return price bids to fulfill the order. In some forms, these price bids are then used to update the best price database for use for both the user associated with the list as well as other users.

FIGS. 7A-7F illustrate a method and system for managing inventory utilizing the processes of 1A-2B above. First the current inventory of the user, such as an organization or company, must be entered into the system. The system is a cloud hosted asset management application designed to streamline the management of resources, for example IT resources, in a company setting. The system includes applications for handling recording inventory, ordering inventory, deploying inventory, and tracking inventory, such as recording consumption of consumable resources. The system analyzes data over time to augment the resource management plans, such as automatically updating the order subscriptions of consumable products, recommending orders and frequencies, and identifying surplus or stagnant inventory to be resold.

The term "user" is used herein to describe the activities of a person interacting with the system. The "user" need not be an individual, it can instead be a team of individuals each of whom have access to the system. In some forms, multiple members of an organization have access to a shared account with different roles, such as manager, IT employee, and deployable person. Additionally, locations and person assigned to pieces of inventory are tracked and that activity is also managed over time. In some forms, every member of an organization has some access to the system to access and/or edit data with respect to inventory currently assigned to them.

Figure 7A:
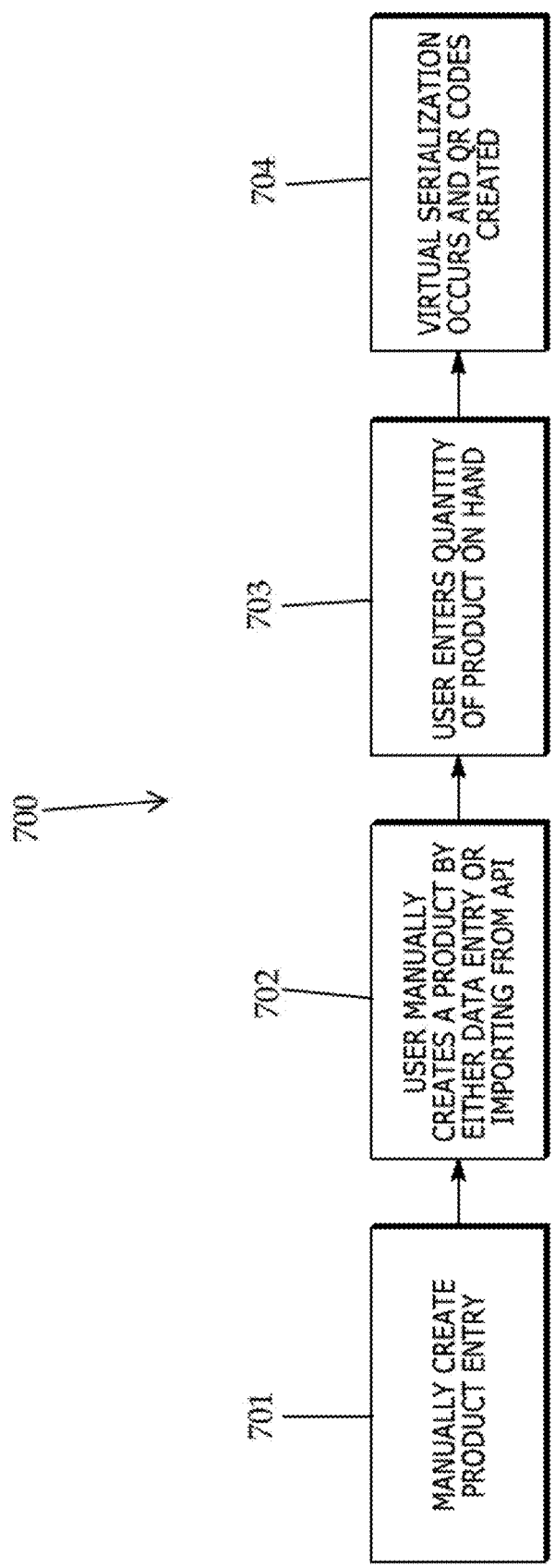
FIGS. 7A-7F show flow diagrams of an apparatus, system and/or method for assisting in inventory management.

As described in FIG. 7A, product entries are manually created 701. In some forms, the product entries are manually created by entering 702 the relevant data into a form in the system. Alternatively, the product entries are imported from a format understood across multiple operating systems, such as an API. For each product entered, the user enters 703 a quantity of products currently on hand. The system then generates 704 virtual serializations for each individual product. The serializations are unique to the individual units, not just to the type of product. For example, if the user inputs that the current stock includes 20 laptop computers. The system will generate 20 unique virtual serializations to correspond to the 20 individual laptop computers. Each serialization has a corresponding code that can be attached to the unit, such as printed and pasted. For example, barcodes, QR codes, or 3D barcodes can be used, printed out, and then secured to the units. In some forms, RFID stickers are used for the virtual serialization. By these codes, individual units can be scanned, such as by a portable computer or smartphone, and then data on that unit is retrieved from the system. The data can be stored locally on a central computer or in cloud storage.

Use of the virtual serialization is also used by individuals in possession of resources to input and manage requests, such as deployment requests, support requests, or trouble tickets. In one form, an application on a smartphone displays forms for making the requests in connection with a scanned code, the application records the user inputs into the form and then transmits the form to the relevant individual, such as the IT department.

Figure 7B:
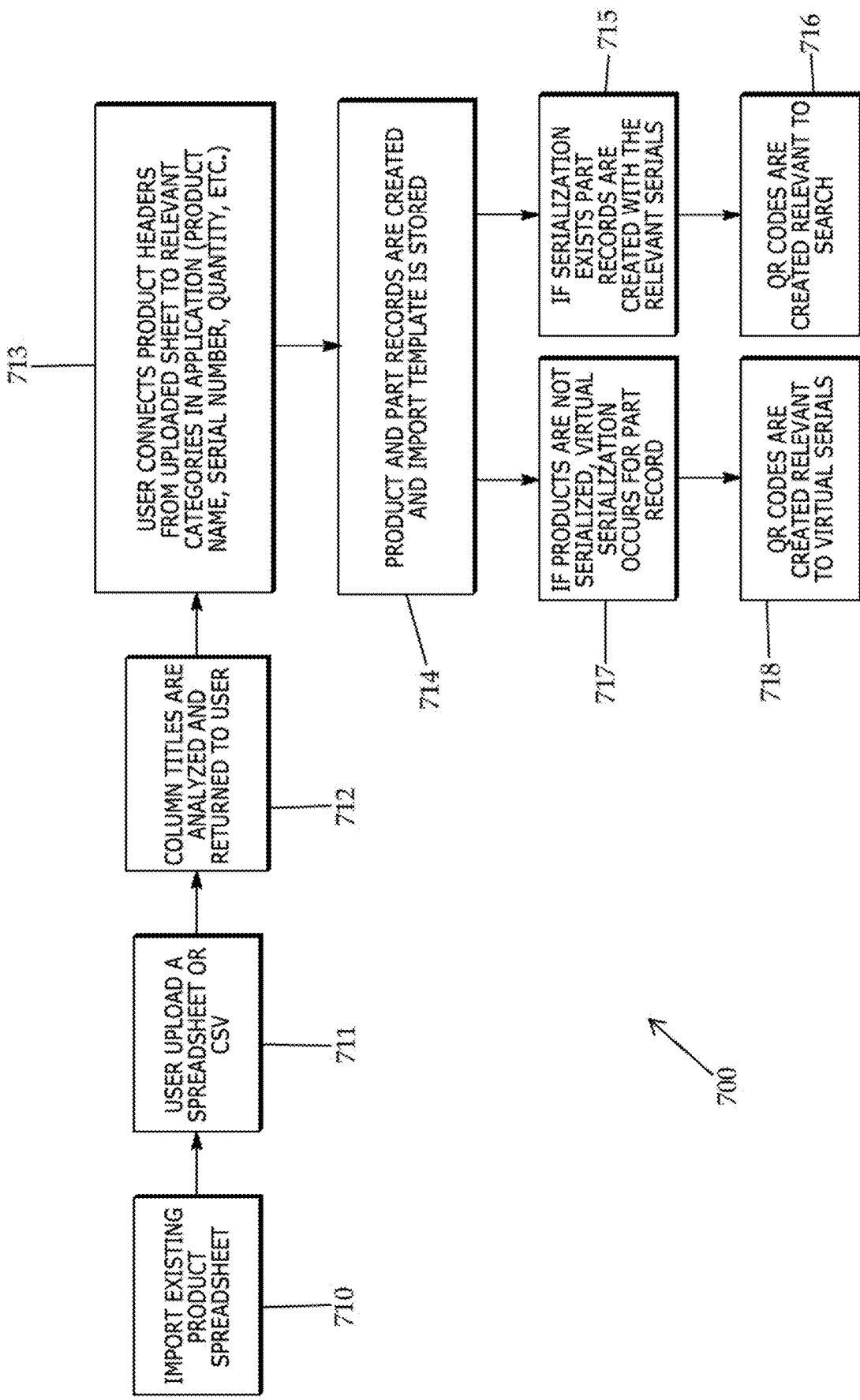
Figure 7C:
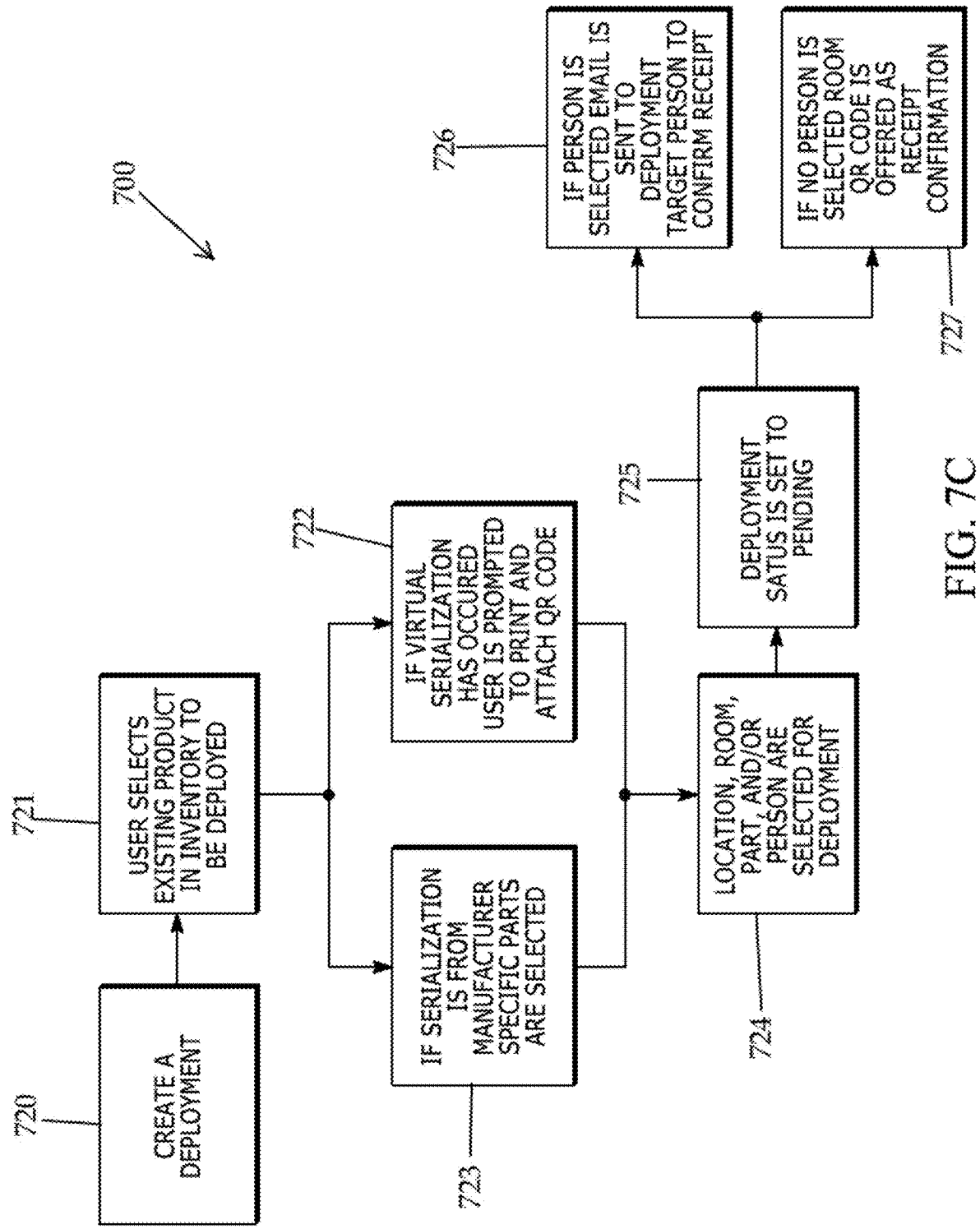

Instead of manually inputting each inventory entry into the system, existing inventory databases can be parsed for the relevant information through the import 710 existing product sheet process shown in FIG. 7B. The parsing is substantially similar to the parsing described above. The user uploads 711 the database file, such as a spreadsheet or comma separate values ("csv") formatted text file. The system scans the column and row titles, analyzes them, and returns 712 them to the user. The scanned titles are compared to expected titles, such as "name", "serial number", "quantity", "manufacturer", etc. If the titles are not automatically identified by the system in this comparison, they are displayed to the user who is prompted to input 713 information identifying what the title refers to. Once the columns or rows are connected to corresponding categories in the system, the product and part records are created 714. The import template is stored 714 such that when future documents having the same template are uploaded, the titles can be identified without user input.

Some products might already have individual, unique serialization. If the products have unique serializations, part records are created 715 with the relevant serials. The system uses those serializations and generates 716 codes, such as QR codes, that can be printed and attached to the product based on those serializations. If no individual serializations already exist, virtual serializations are created 717. Then, corresponding codes, such as QR codes, are created 718 which are also printed and attached to the products.

In some forms, the QR codes are not generated and printed/attached until the product leaves inventory. For example, if the inventory has 20 laptops, 20 serializations are created. However, these 20 serializations are not assigned to individual laptops until the laptops are deployed. When the first laptop is deployed, it is assigned the first of the 20 serializations and is marked with the codes, such as a QR code. The other laptops are marked as they are deployed in the same manner. Deployment is described in greater detail in FIG. 7C. To deploy 720, the user selects 721 a product in the system to be deployed. If the product is unmarked, they are prompted to print and attach 722 a code as described above. If the product is already marked 723, such as by the manufacturer or during a past deployment, this step is skipped. The user further selects 724 a target of deployment. The target can be a location or a person. In some forms, the location may be another product, for example a computer component may be deployed to a computer.

The system records 725 the deployment as pending until confirmation is received. If the deployment is to a person, the person is prompted 726, such as via the application or via email to confirm receipt of the product. Once it is confirmed the system update the location of the product. If the product is being deployed to a location, the person doing the deploying confirms 727 deployment. In some forms the individual locations, such as individual rooms, have serialization and corresponding codes, such as QR codes. When a product is deployed, the person doing the deploying can scan the QR code of the room to confirm deployment.

Figure 7D:
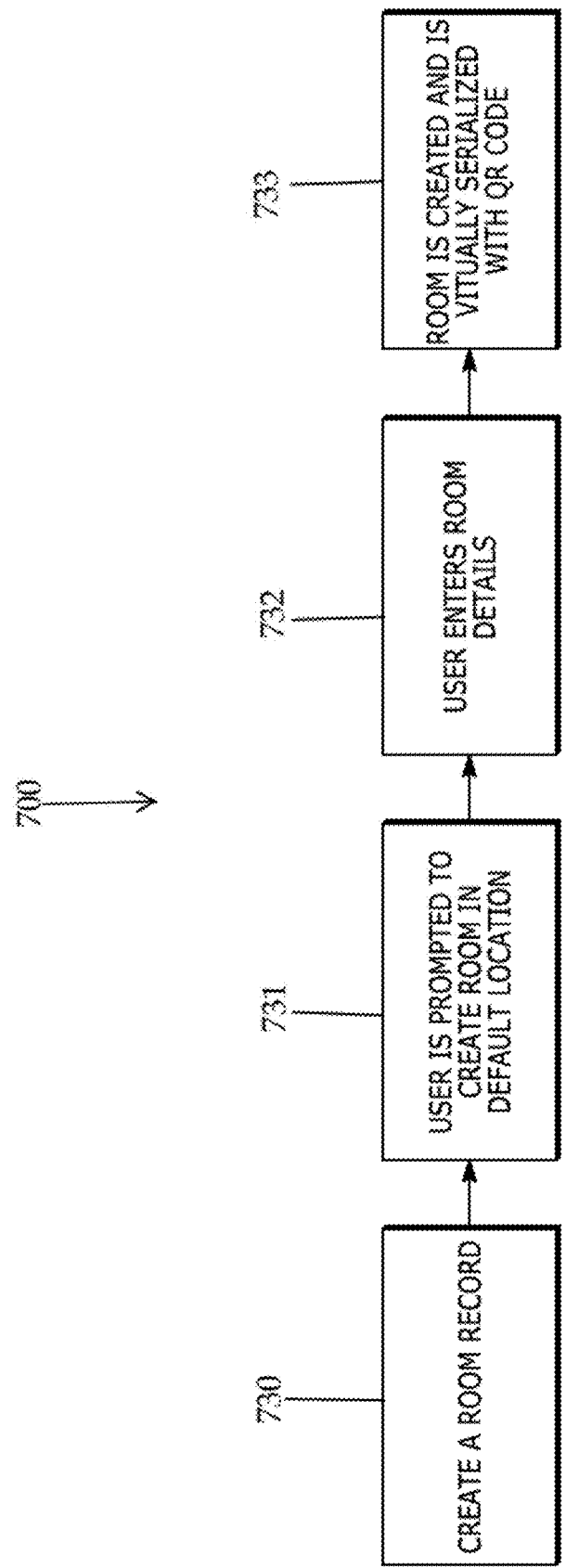

Creation 730 of a location is illustrated in FIG. 7D. The user creates 731 an entry for a room in the system. The user then enters 732 information about the room into a form generated and displayed by the system. The system then creates 733 a virtual serialization with a corresponding code so that the room can be marked.

Figure 7E:
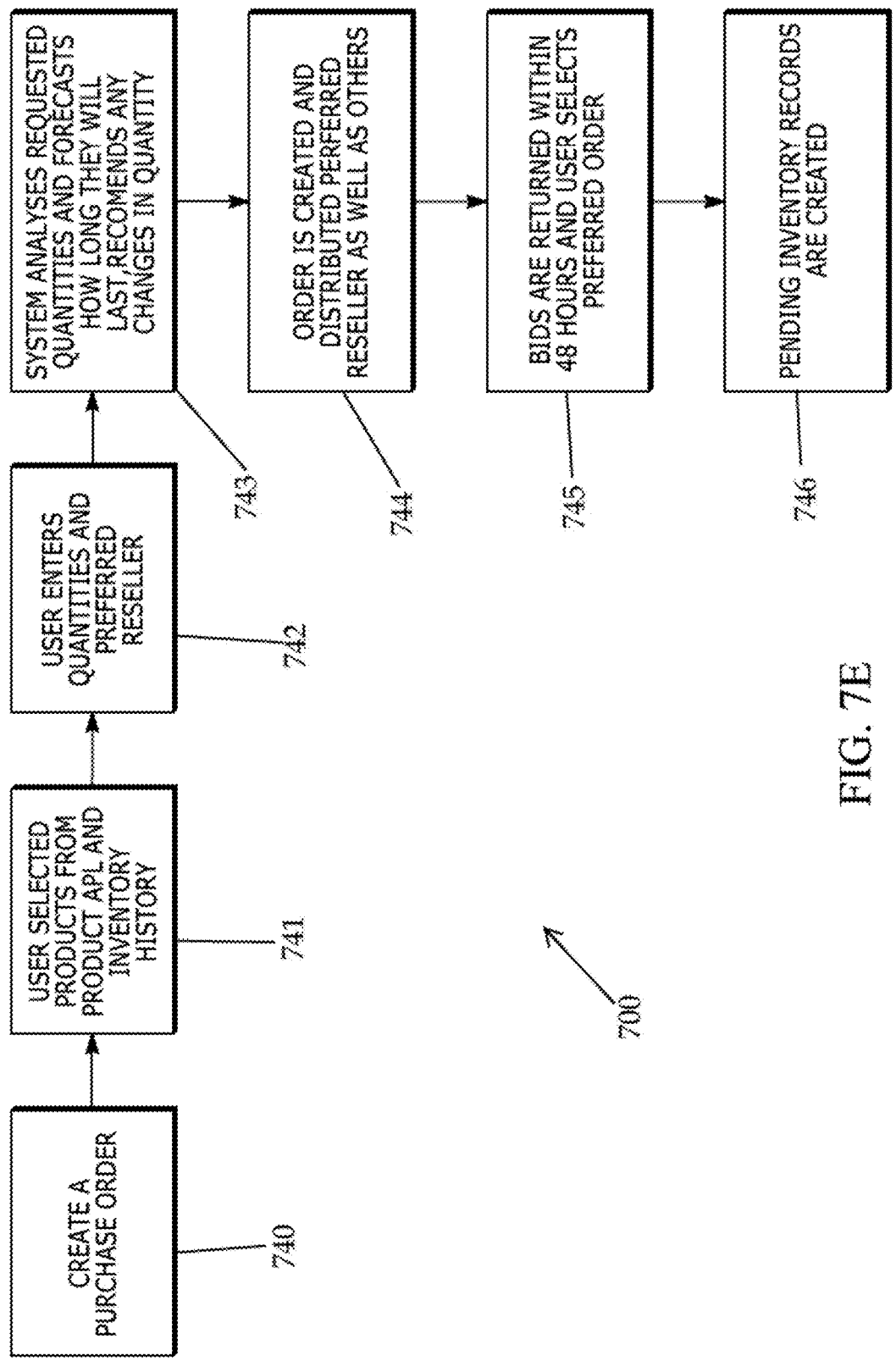

Turning to FIG. 7E, the system can be used to coordinate with entities outside of the organization for inventory control, such as by creating 740 purchase orders. A user can manually create a purchase order by selecting 741 a product from their API or from their inventory history. The user then enters 742 the quantity to be purchased. In some forms, the user selects a preferred reseller from which to make the purchase. The system analyzes 743 the request and forecasts how long it will take to fulfill the order based on information from the systems and methods of FIGS. 1A-2B above. The order is created 744 and distributed to the preferred reseller as well as other resellers. The resellers return 745 bids within a predetermined amount of time, such as 48 hours, which are displayed to the user so that the decision can be made. In some forms, the decision is automated based on previously input preferences. For example, the order can automatically accept the lowest cost bid that can deliver the product by a predetermined deadline or within a predetermined timeframe. Alternatively or additionally, the system may store a list of previously approved to disapproved resellers. Once the order is processed, pending inventory records are created 746 so that serializations can be assigned once the order is received.

Figure 7F:
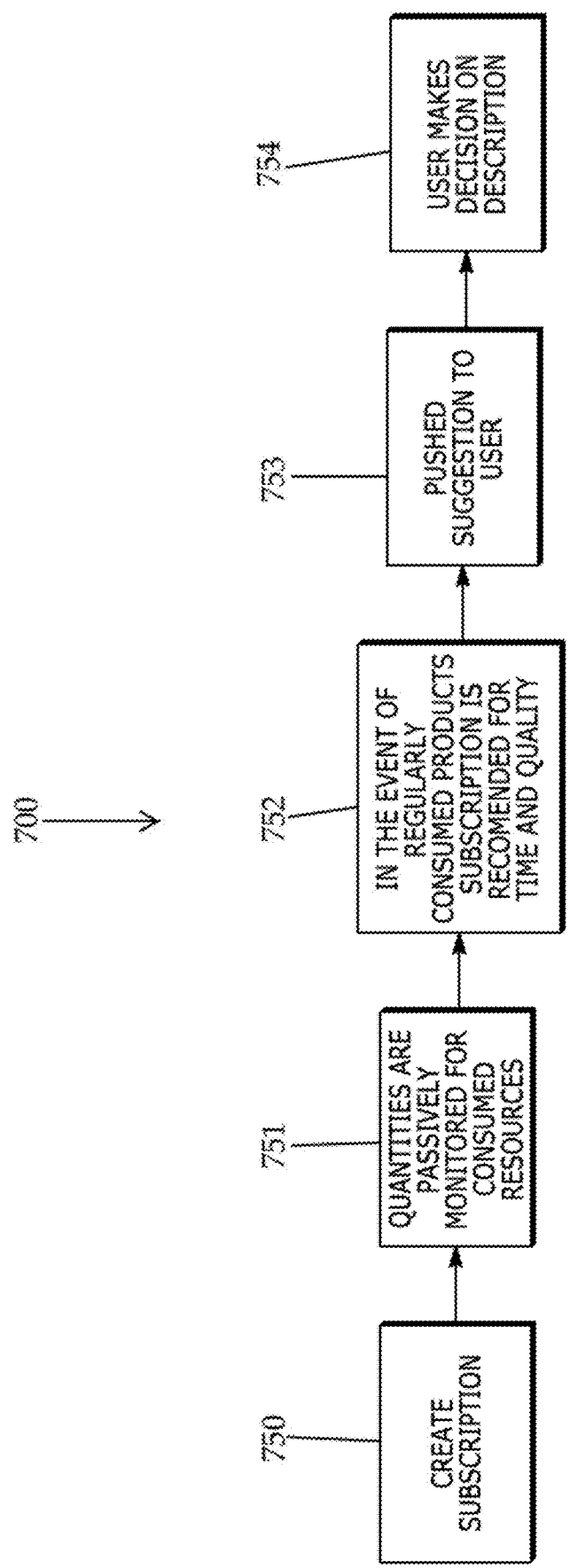

In addition to one-time orders, subscription orders can be created 750 by the system 700 as shown in FIG. 7F. The system passively monitors 751 the rate at which products are consumed by the organization. For products that are consumed at regular rates, the system suggests 752 time and quantity for subscription-based purchases. The system finds the best deals for these subscriptions as described in FIGS. 1A-2B above. The recommendation is sent 753 to the user, and the user makes 754 the final decision based on the information sent.

In some forms, the system utilizes the methods of FIGS. 1A-2B to push other types of purchases. For example, when a group buy, sales event, or other similar temporary price reduction is offered by a reseller, the system pushes recommendations for order to the user sooner than it normally would. In some forms, the pushed recommendation includes information representing the projected savings as well as the projected amount of time until the products are needed.

Figure 8A:
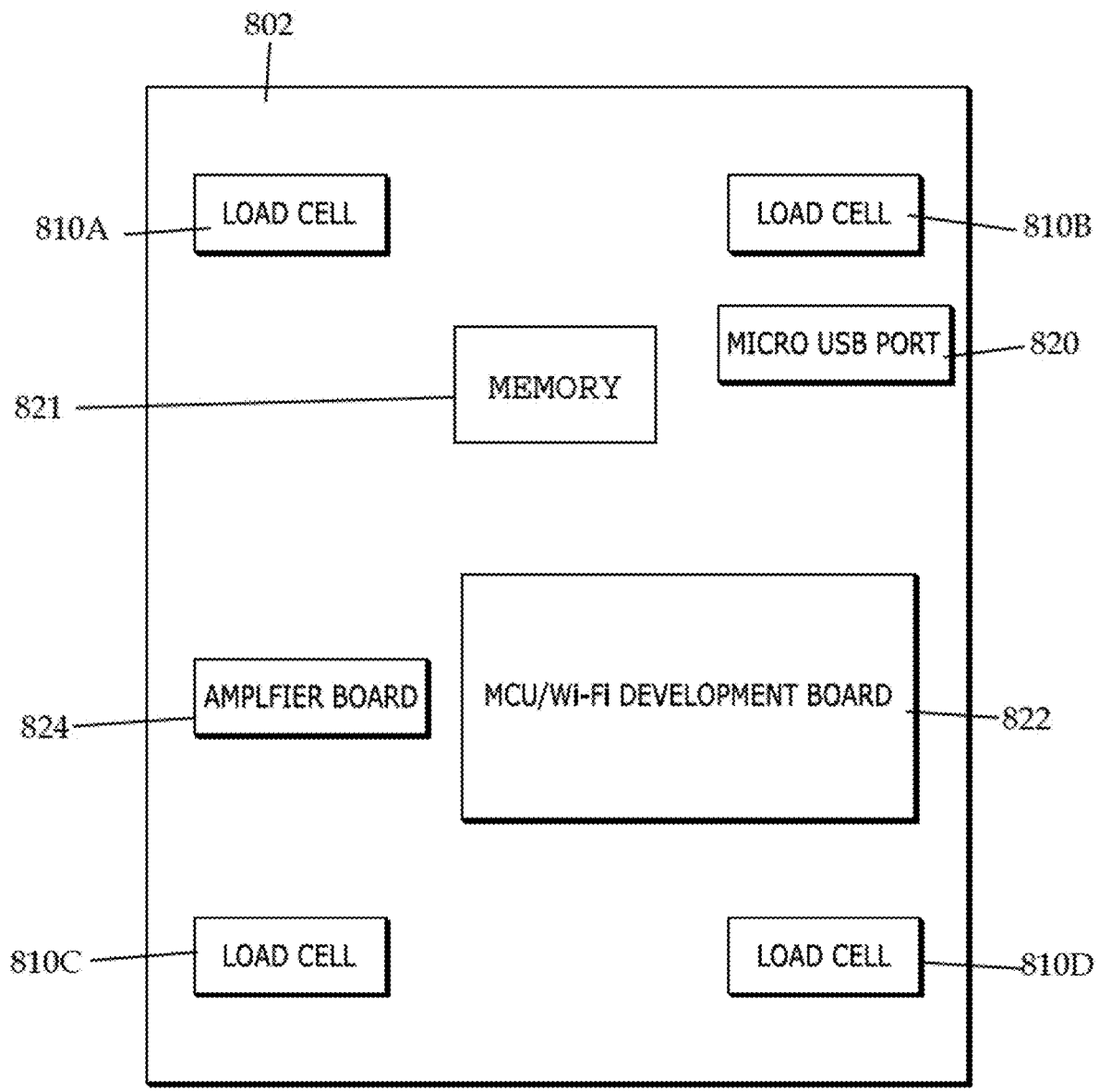
FIG. 8A is a block diagram of a shelf with weight sensors.
Figure 8B:
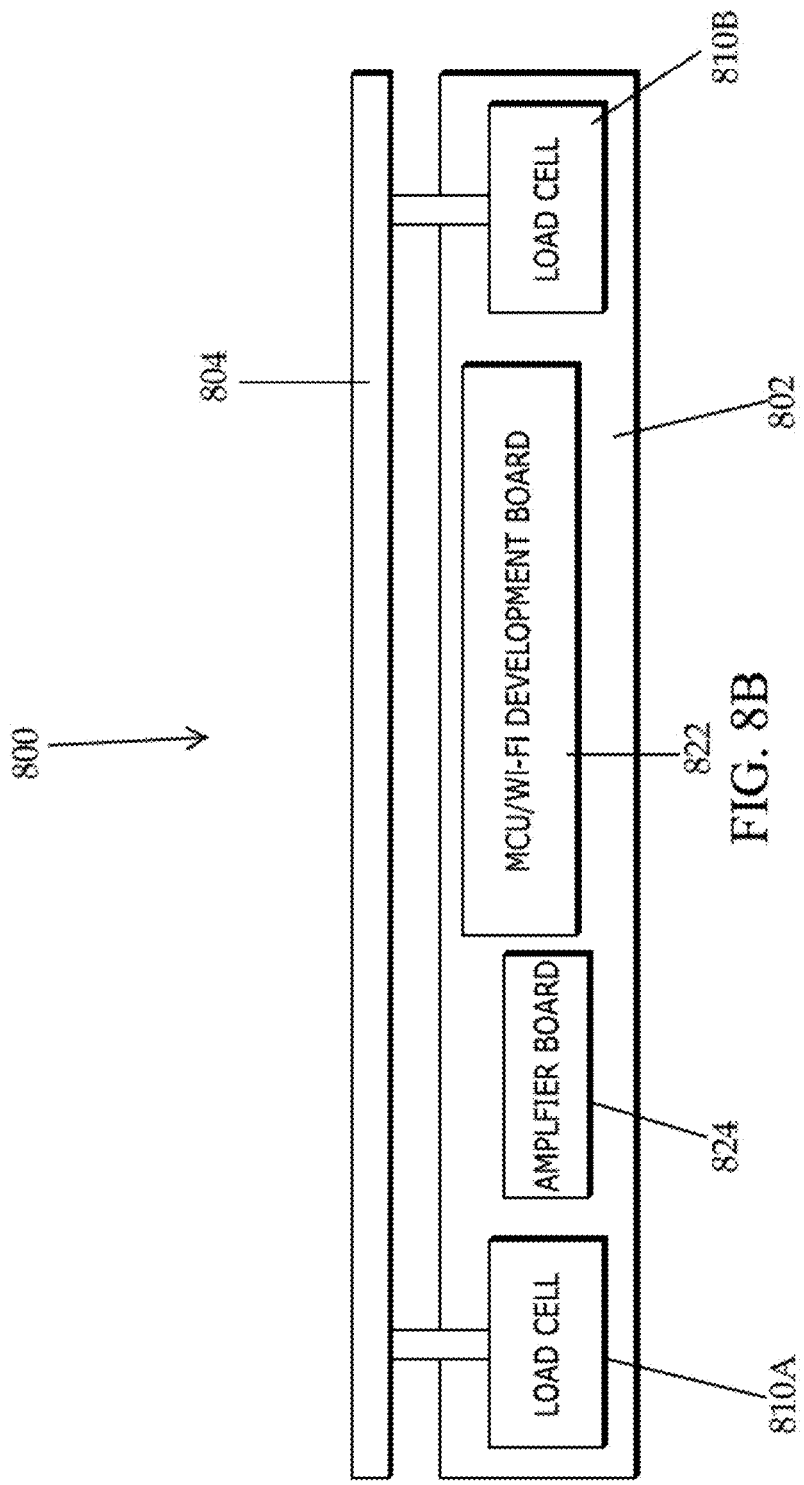
FIG. 8B is a side view block diagram of the shelf of FIG. 8A.

In addition to the scanners described above, some systems utilize additional sensors to automate the tracking of inventory. For example, sensors in the supply room detect the presence of and quantity of products. In one form, scales are used to detect products. For example, tension bar scales built into the shelves. An exemplary shelf 800 with load cells 810A-D for detecting the weight of a product is shown in FIGS. 8A-8B and described below. Alternatively or additionally, conductive plastic is used as a shelf surface, such as Velostate®, to detect the shape and weight of items. The shape and weight are compared to stored values to identify the product and quantity of products.

Below an exemplary use of the system and methods of FIGS. 7A-7F is described. This example is not limiting, it is just to illustrate the system in greater detail by use of an example. While an IT department is used in the example, other departments or organizations can use the system.

Data Types in the System of FIGS. 7A-7F

Team—The IT staff of an organization or all entities that would be actively managing inventory.

User—Individual member of the IT team, can have limited access to data set and limited capabilities Location—A physical address of a business, can have inventory assigned directly, has QR Code.

Room—Belongs to a location, can have inventory assigned to it, either deployed or stored, has QR Code.

Person—A non-user entity that can be assigned inventory i.e. an employee at a company, can have QR Code.

Product—An item that is owned by a company, a type of products, such as a Macbook Pro, would be a product.

Part—The individual manifestations of a product. The three Macbook Pro's on hand would each be a part related to the parent product, has QR Code.

Deployment—The movement of a part to a person, place, or product, has parts assigned to it and destination for those parts, has QR Code.

Order—A user constructed order of products.

Offer—A reseller price response to an order.

Template—A recorded record of connected data types from a product data import.

Virtual Serialization

The created faux serial numbers attached to parts in inventory for the purpose of tracking deployment and activity related to them. An easier way to serialize and manage individual part records.

Inventory Deployment to Person

You have 10 laptops in your inventory that aren't currently deployed, a new employee joins the company and needs a laptop. At this point, you've already created the person record in the system.

1) Click create simple deployment and assign a laptop to that deployment.

2) In this particular instance the laptop will travel with the person so rather than assigning it to a room, we just assign it directly to a person record, the new employee 3) The system directs you to retrieve a laptop and print the virtualized 'serial number' in the form of a QR code and attach it to the laptop.

4) The deployment status is set to 'pending.'

5) A) The laptop is delivered to the person who will be using it and they open the QR code scanner on their smart phone and scan the QR code. They confirm their identity and the deployment is closed. B) The user who is delivering the laptop opens the TekCloset Mobile app and scans the QR code and takes a picture of the employee with the laptop, the deployment is marked closed.

Inventory Deployment to Room

Same scenario as above except in this instance we will be deploying an Apple Cinema Display monitor to the employee's office. This particular piece of inventory shouldn't be going anywhere so we will be deploying it to a room, but also attaching it to a person record.

1) Click create simple deployment and assign the monitor

2) Search either the person or office that the monitor will be deployed in

A) In the instance that the requisite room has not been created, simply select the person and click the "Deploy to Room box" and a room "New Employee's Office" will be automatically created B) If the room has already been assigned to a person the inventory will also be associated with them as well 3) The system will then direct you to either scan an existing QR code on the part or print and attach a new one.

4) The deployment status is set to pending.

5) Once the monitor has been delivered the user scans the QR code on the room and completes the deployment.

FIGS. 8A-B illustrate a shelf unit 800 having a plurality of load cells 810A-D. The shelf unit 800 includes a base 802 and a product support 804. The base 802 houses one or more load cells 810A-D. The product support 804 is supported by the load cells 810A-D such that the weight of the support 804 and supported objects is measured by the load cells 810A-D. In some forms, the load cells 810A-D only measure the total weight of the support 804 and supported products. In alternative forms, data from the array of load cells 810A-D enables the system to approximate the location from which a product was removed, such that the identity of the product can be predicted based on the location and weight.

The shelf unit further includes a MCU/Wi-Fi development board 822 and amplifier board 824 that together transmit a wireless signal conveying the data from the load cells 810A-D. Alternatively or additionally, the shelf unit 800 includes a memory unit 821. The memory unit 821 records and stores data output by the load cells 810A-D. The user can access the stored historical data through an input/output port 820, such as a USB, Mini USB, or Micro USB port.

In operation, the load cells 810A-D output data representing a change in weight of the product support 804 and supported products. The data is transmitted to a computer, such as an onsite computer or a remote server. The computer or server has a processor and a memory unit. The processor compares the measured data to a database, stored on the memory unit, of known values, such as weight and location, or products stored on the product support 804. Through this comparison, the system identifies the product and quantity of products removed. In some forms, instead of a remote computer and local controller with a memory unit and a processor performs the steps described above. As described in the processes above, the system tracks the rate at which products are removed from inventory in order to develop and recommend purchasing plans to replenish the inventory before it reaches zero.

While the shelf unit 800 is shown as a flat, horizontal shelf, it is understood that the shelf unit 800 could be replaced with any type of product support having a weight sensor. For example, weight sensors could be added to an existing counter, bin, cabinet, drawer, or other structure configured to support products. The weight sensors would be communicatively coupled to a processor to operate in the same way described above.

In some forms, the weight sensors are Internet of things weight sensors having built in wireless communications modules. The built-in wireless communication modules operate to transmit data representing the measured weight to a remote processor.

Figure 9A:
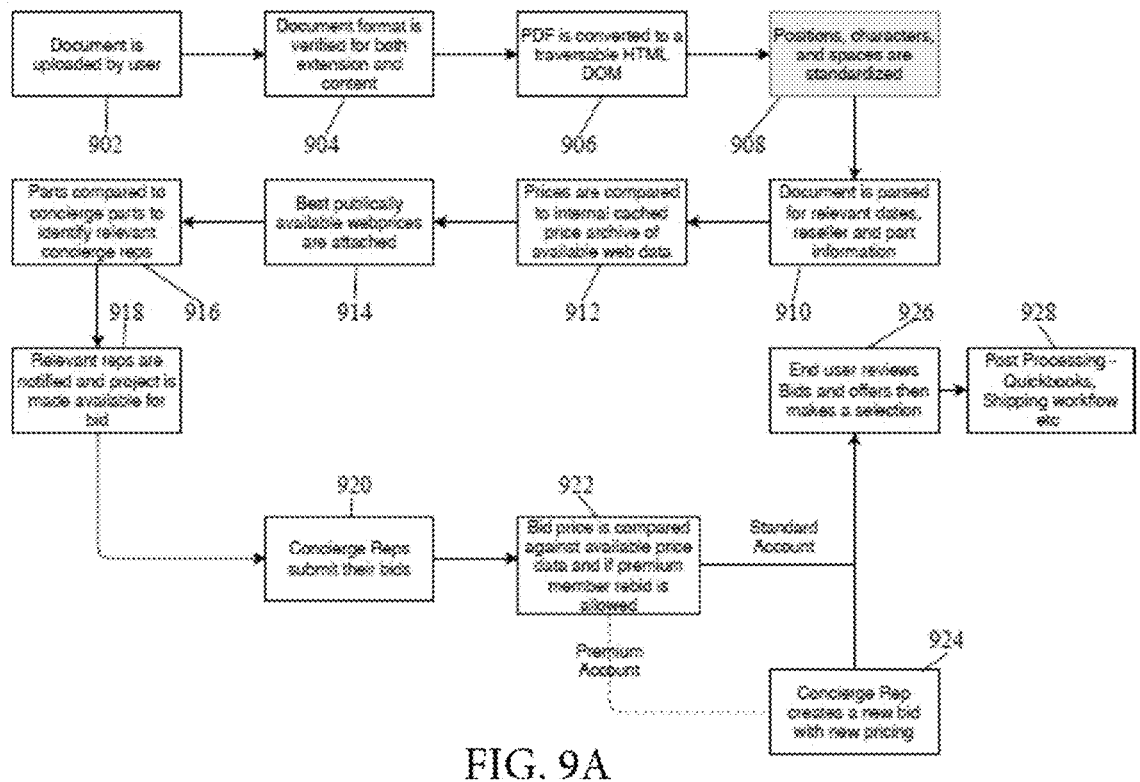
FIG. 9A is a flow diagram of an apparatus, system and/or method for assisting in consumer purchasing.

FIG. 9A illustrates a method and system for aiding in consumer purchasing. The method begins with a user uploading 902 a document, such as a shopping list or invoice. The user is an individual or an entity, such as a company or organization. For companies or organizations, a number of authorized individuals (or stakeholders) are identified and able to upload documents to initiate a project. The user has an administrator able to add and remove authorized accounts associated with the user.

The system verifies 904 the content of the document. Verification includes both verifying the format of the document for both extension and content. Once verified, the document is converted 906 to HTML Document Object Model (DOM). The HTML DOM format is readable by the parsing application so that the content of the document can be read by the system. In alternative embodiments, document types other than HTML DOM is used by the parsing application. The HTML DOM document is standardized 908 for spacing, positions, and characters. The standardization process is described in greater detail below in the discussion of FIG. 9B. After standardization, the document is parsed 910 for relevant information. Relevant information includes part information (such as part number, manufacturer name, model name, etc.), dates of past transaction, dates of future transactions, reseller information, price information, and quantity information.

Once the objects from the list are identified, they are compared 912 to stored prices in the system. The comparison stem 912 compares various publicly listed prices of the specific part from multiple sellers. In addition, the system accesses a database identifying comparable alternative products, such as similar products from the same manufacturer or alternatives made by other manufacturers. The prices of these alternative products are also included in the comparison. In some forms, the alternative products in the database includes house brand products sold by the retailer.

The alternative product database is built out over time. Some products identified by the manufacturers as direct replacements (such as new models or premium models) are automatically uploaded to the database. The system also identifies comparable products that are not directly linked, such as products made by other manufacturers, by analyzing the technical specifications. Products identified in this way are reviewed and approved by a human before being added to the comparable product database in order to ensure that the products are truly comparable.

The system can further form connections between comparable products based on shared connections. For example, if Product A is comparable to Product B, and Product B is comparable to Product C, the system will automatically form the connection that Product A is comparable to Product C. In some forms, these automatically identified connections are reviewed by a human before the database is updated.

In addition to current prices, the system stores caches of prior webpages or prior price information. The cached price information is used to provide a context for the current prices and to identify pricing trends. For example, if the product is currently on sale, the cached price information having the non-sale price is used to determine the amount of savings the sale provides. Additionally, the stored cache sales data can be used to identify seasonal variations in price such that price changes can be anticipated.

The publicly available prices from the comparison are attached 914 to the project and sent to the user. The prices include a list of current prices and associated sellers for the identified part. In addition, the price list may include the part number, seller information, and prices of the comparable products identified above. This include specifications and/or technical comparisons to illustrate the similarities of the two products so that the user can determine if the alternative product is suited for their needs. Additionally, the available prices will identify any temporary prices, such as sales prices, included in the list along with the sales price expiration date.

In addition to identifying publicly available prices, the system also identifies 916 concierge representatives associated with the listed parts. As discussed above, the concierge representatives are sales representatives associated with either specific sellers, specific users, specific products, or specifics fields of products. Based on the products parsed from the document, one or more concierge reps are notified 918 and a project is created in the system. The concierge representatives prepare and submit 920 bits on the project. In some forms, the bids include a single price for fulfilling the entire project, i.e., a price for every product on the list. Alternatively, the concierge representatives bid on individual products within the list.

The system compares 922 the bid prices to the publicly available attached in step 914. In some forms, the concierge representatives are notified if their bid price does not beat the publicly available prices such that a concierge representative can rebid 924. In one form, the rebid 924 is only available to concierge representatives who have a higher level or premium account. Alternatively, the rebid step is available to all concierge representatives if the document was uploaded by a user having a premium account.

In some forms, the concierge representatives automate the rebid process. Products have a lowest possible sales price, or price floor, at which the concierge representative is able to sell the product. The automated bidding automatically generates a bid that is the higher of a predetermined percentage below the lowest publicly available price (such as 1%-5% lower) and the price floor.

The bids from the concierge representatives are sent to the user. The end user then reviews the bids along with the publicly available prices and selects 926 a purchase option. In addition to the bid prices, additional information is included. For example, customer reviews of the products and/or the concierge representatives, historical pricing (for example, prices over the past 30 days, 60 days, and/or 90 days), and technical descriptions of the identified comparable products.

Once an option is selected, the system sends the purchase order to the seller and the sale is made. In addition, the system automatically generates an invoice or receipt. In some forms, the automatically generated invoice is of a format readable by bookkeeping software, such as Quickbooks such that the sale is automatically loaded into the software.

In some embodiments, the user provides information in addition to the standard part number, quantity, and price information. Potential information may include budget information, product usage rate information, historical purchase and usage information, and/or projected future usage information. This additional information is used by the system and/or the concierge representatives to more narrowly tailor recommendations to the user. For example, budget information can be used to recommend alternative products in order to meet a budget that would otherwise be exceeded. Alternatively, if room remains in the budget, additional purchases of non-perishable products is recommended in order for the user to build an inventory of products that will be needed later. The future use information, or future use needs extrapolated from the historical use information, is used to recommend purchases before needed during sales or low price periods in order to save money.

In addition to being used to facilitate sales, the above identified system can be used to generate retroactive price savings reports. The user uploads invoices from past purchases. The invoices are parsed for the product information, price information, and invoice date. The invoice prices are compared to the cached historical prices and/or current prices to identify instances in which the user overpaid compared to the prices available through the system.

Figure 9B:
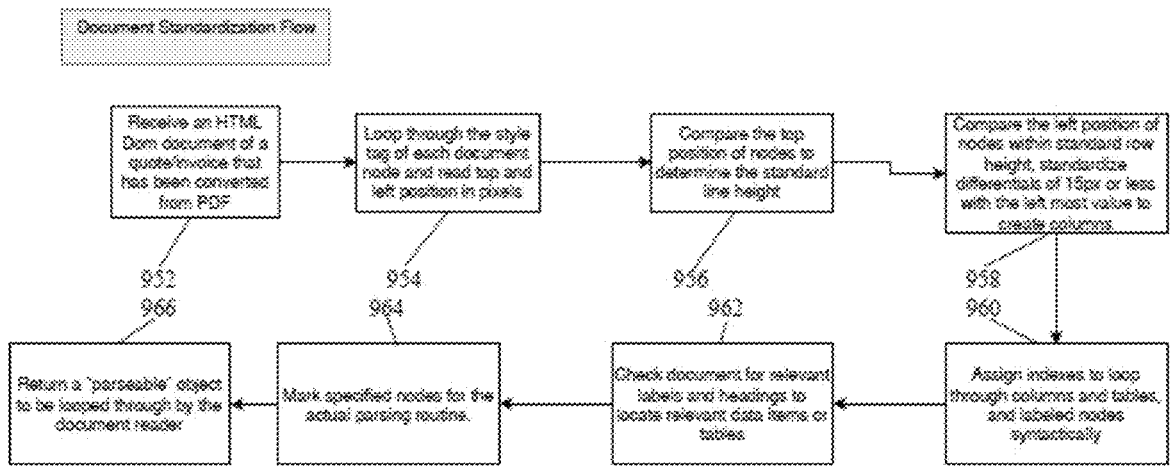
FIG. 9B is a flow diagram of an apparatus, system and/or method for parsing a document.

FIG. 9B illustrates a method for standardizing a document, such as occurs in step 908 above. The standardization software receives 952 a document, such as the HTML DOM document generated above, of a quote or invoice that has been converted from a different file format. The system loops through 954 the style tag of each document node and reads the top and left position in pixels. The top and left pixels are used to identify where the entry begins. The top position of the nodes is compared 956 to determine the standard line height so that the different lines of data can be more easily identified and parsed. The left position of the nodes is compared 958. Small differences, such as differentials of 15 px or less are standardized with the left most value to create a standardized column. Larger differentials identify a difference in columns.

In step 960, indexes are assigned to loop through columns and tables and labeled nodes syntactically. Next, the document is checked 962 for relevant labels and headings in order to locate relevant data items or tables. For example, labels or headings may identify specific types of data contained in the column or table, such as prices, quantity, part number, etc.

Based on the above steps, the system marks 964 specified nodes for the parsing routine to parse. The parseable object, e.g., the standardized document, is returned 966 to the document reader software to be parsed.

As discussed above, the comparable products include house brand products of the seller or marketplace. In some forms, the price of the house brand is automatically generated based on the prices of the other products. The price of the house brand is set at the higher of a predetermined lowest possible price, and a predetermined percentage below the lowest cost of the non-house brand alternatives (for example 1%-10% lower). In one form, the house brand is set 5% below the lowest price alternative so long as that is equal to or greater than the lowest possible price for the product.

Figure 10:
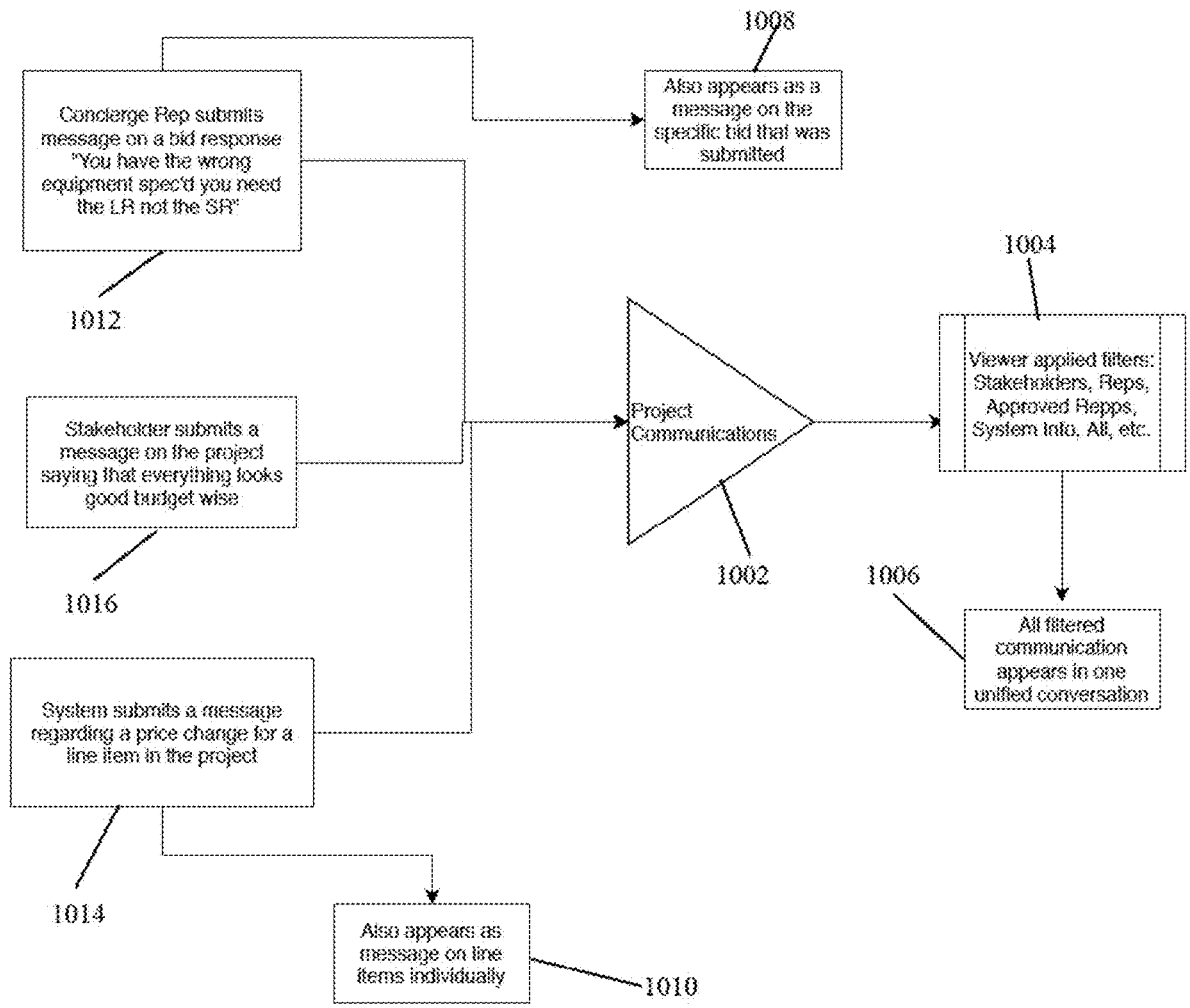
FIG. 10 is a flow diagram of an apparatus, system and/or method for organizing messages.

A number of messages are generated with respect to the projects discussed above. FIG. 10 illustrates a system and method for facilitating messages across multiple channels to be more easily located by the users. A project communications 1002 database stores all of the communications associated with a specific project or users. The database includes a number of tags 1004, such as the stakeholder, the concierge representative, the approved reps, the products, etc. that are used to filter the communications. When the filters are applied, the filtered communications are viewable as a single unified conversation 906.

In addition to the central project communications database 1002, specific types of messages appear at other locations within the project. For example, a message 1012 submitted by a concierge representative about a specific bid, such as a message relating to the specific products identified in the document, alternative products, or prices, appears as a message on the specific bid 1008. In another example, a message 1014 automatically generated by the system relating to a price change on a product appears as a message on line items 1010 individually. Other messages, such as a stakeholder submitted message 1016 affirming that the project is within the budget only appear within the project communications database 1002. The database 1002 preserves a record that can be referenced later by the user to ensure that certain steps were taken, such as the stakeholder confirming that the budget was met.

Figure 11:
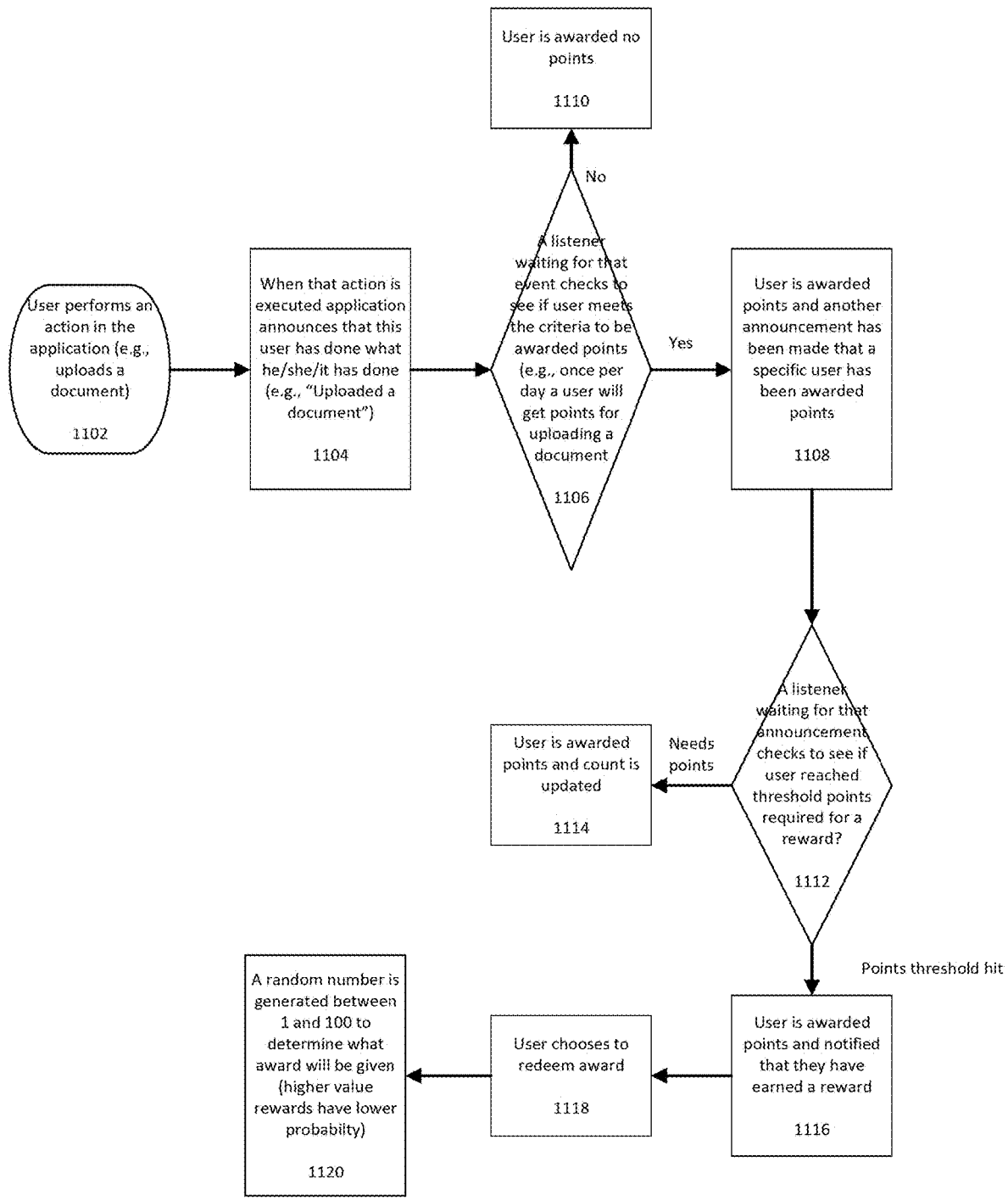
FIG. 11 is a flow diagram of an apparatus, system and/or method for an awards system.

FIG. 11 illustrates a rewards system and method for use with the systems described above. The awards are randomized, providing users an opportunity to win rewards more valuable than would otherwise be available in a nonrandomized system. In order to qualify for awards, the user must first take part in the above system, such as by uploading 1102 a document.

The system generates 1104 an alert indicating that the action 1102 was taken. The system includes a listener which receives the alert and checks 1106 to see if the action meets the predetermined criteria for being awarded points under the reward system. For example, the criteria requires that a document to be uploaded on a certain date and the listener compares the upload date to the required date. If the action 1102 meets the criteria, the user is awarded 1108 one or more points and announcement indicating that points have been awarded is generated. If the action 1102 did not meet the criteria, the user is not awarded 1110 points.

A listener receives the point alert and compares 1112 the total points awarded to the user to a stored threshold required to qualify for rewards. If the user does not yet meet the threshold, the user is awarded points and the count is updated 1114. If the user does meet the threshold the user is awarded the points and a notification is sent 1116 to the user indicated that the threshold is met. After receiving the threshold, the user chooses to redeem 1118 the awarded points. The system randomly selects 1120 one of the available rewards when the awarded points are redeemed. In one form, the random selection involves using a random number generator and comparing the generated number to an index of rewards and corresponding values. The rewards vary in value. For example, multiple rewards may offer a discount of different amounts, such as a 1%-15% discount. In some forms, the higher value rewards are less likely to be selected than the less valuable rewards. In some embodiments, all of the rewards relate to savings on future purchases, such as discounts or free shipping offers. The rewards must be activated within a certain time frame after redemption, such as within 30 days or 60 days. Once activated, the rewards are only active for a certain number of purchases or amount of time, such as 24 hours or 1 order. In alternative forms, other rewards are possible. For example, rewards may include free products as prizes.

The above described systems include the step of a user uploading a document. In some forms, this is done through an interface such as a webpage or application. In alternative forms, the systems are interfaceless. FIGS. 12A-12B illustrate an interfaceless method and system for interacting with the systems and methods described above.

The interfaceless system involves installing an extension or application that runs in the background to identify documents, such as email attachments, to be uploaded into the purchasing systems described above. FIG. 12A illustrates an exemplary set up process utilizing a Google Chrome extension. It is understood that extensions for other browsers or background applications for tablets, smartphones, or computers can also be used for the interfaceless system. First the user logs in to 1202 the purchasing application. Within the application, the user connects 1204 the application account to a google account (or other account associated with the preferred browser or operating system). The user is linked 1206 to an application store where the extension or application for interfaceless use is downloaded for installation. The user installs 1208 the extension or application. In some forms, the extension or application identifies a locally stored key to authenticate the extension or application and connect the extension or application to the user's account with the purchasing application.

Once installed, the user sets 1210 the preferences within the extension or application. The preferences include a number of settings for automating the uploading process. For example, the settings identify where the application or extension monitors for documents or data to be uploaded. Potential options include email bodies, email attachments, online shopping carts, bookkeeping software, and inventory monitoring software. If emails and/or attachments are monitored, the user can identify specific sender/recipient addresses or specific email domains that are monitored. Identifying specific addresses or domains prevents the application from monitoring the contents of other emails. Preferences further include payment options and purchase verification requirements.

FIG. 12B illustrates a process followed by the interfaceless application or extension. The process of FIG. 12B is an exemplary application or extension which monitors received emails for attachments. It is understood that the process of FIG. 12B is similar to processes used to monitor things other than received email attachments as described above.

The user receives 1212 an email. The application evaluates 1214 the sender information of the received email to determine if it is a sender address or domain listed in the preferences to be monitored. If the sender is not listed, the process ends 1236. If the sender is approved 1216, the email is checked 1218 for attachments. The extension of the attachment is verified 1220 as a file type readable by the system. If the extension of the attachment indicates that it cannot be read by the system, the process ends 1236.

If the document does have a readable extension, the document is passed 1222 to the purchasing system. As discussed above, the purchasing system parses the document and creates a project 1224. The automation setting selected in the preferences are verified and applied 1226. With the settings applied, the standard project criteria is followed 1228 as described in the methods above. If the process is not automated, the user is notified 1232 once the project is formed in order to complete the purchase. If the process is automated, the automation criteria is employed 1230. The system compares the purchase price to the stored budget, if the project is under budget, the purchase is automatically resolved 1234.

The above described systems relate to ecommerce. The prices and sellers discussed sell products over the Internet and ship them to the user. In some forms, the system receives inventory and price data from stores. Based on the location of the user, local businesses are recommended to make in person purchases as an alternative to the provided ecommerce options. The system sends the purchase information to the local store so that the product is ready to be picked up by the options. The system charges a per transaction or percentage rate on top of the price charged by the store. In one form, the system charges $1 per transaction for the local buy option.

This system provides local businesses with the opportunity to compete with ecommerce retailers and capture business that otherwise would have been lost to the ecommerce website. This system also provides shoppers with the opportunity to compare the prices of products offered through the ecommerce website with local product offerings. Shoppers are also presented with the opportunity to consider their local businesses and support their local economy.

Figure 13:
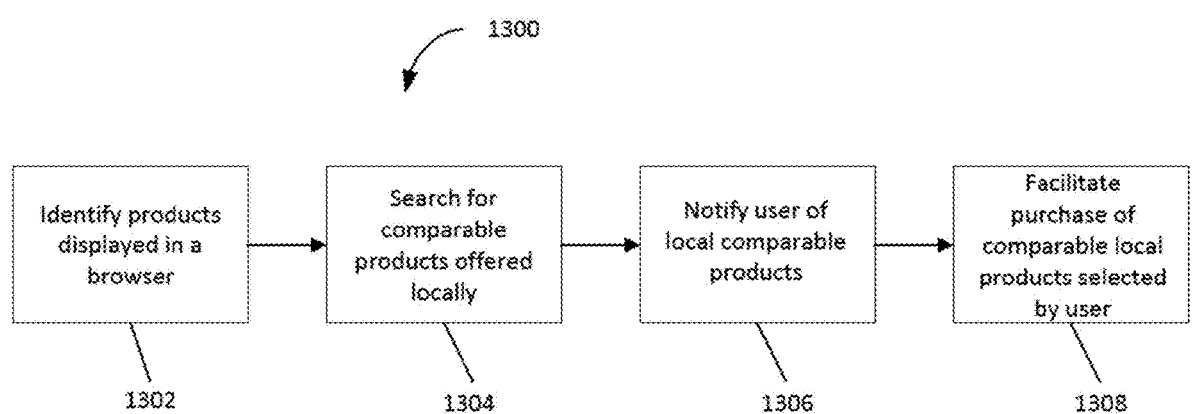
FIG. 13 is a flow diagram of an apparatus, system, and/or method for facilitating purchase consideration of the products of local businesses.

This system may be a web browser extension that notifies the user when a product displayed within the web browser may be purchased locally according to method 1300 shown in FIG. 13. In another approach, the system may be a program or smartphone application that runs when a user is shopping on a web browser application or other smartphone application, such as an application associated with an online retailer. The system may identify 1302 the products displayed via the web browser to the user. The system, upon determining the location of the user, may create a list of all local businesses within a certain radius of the user (e.g., 15 miles) from which it searches or crawls 1304 for comparable products. Upon identifying a comparable product offered for sale locally, the system may notify 1306 the user that a local business is selling the same or a comparable product. In one form where the user is shopping on an ecommerce website, the system may display or notify the user of a local business that offers the same or similar products to those displayed by the ecommerce website to the user. As an example, the system may display a notification, window, or pop up next to each product listed on the ecommerce website where a comparable product is available locally. The notification, window, or pop up may display the name, a picture, and/or the price of the local item and/or the name of the local business offering the product for sale to the user. In another example, the system may simply display text or an icon associated with the web browser extension that indicates a local business offers a comparable product. For example, the system may display "Buy this Product Locally!" or similar text along with a selectable link to the comparable local product offering.

In another form, the system displays or indicates that local options are available when the user goes to a checkout page of the ecommerce site or application. The system may display a notification, window, pop up, text, and/or an icon to the user that indicates that local options are available for products the user has selected to purchase from the ecommerce website. In one example, the system may cause a window to pop up on the user's display screen that indicates that one or more of the products selected for purchase have a comparable option available at a local business.

The system may then facilitate 1308 the purchase of the comparable local products displayed to the user. The user may select a button or link displayed in the window to purchase one or more products from the local business(es). In one example, the user may complete the purchase of one or more products from the local business(es) through the popup window. In another example, the user may be brought to another website to complete their order of the products through the local business(es). The system may place the order with the one or more local businesses through the website. The local business(es) may be notified of the user's order and prepare the product for pickup by the user. Alternatively, local business may ship the product to the user, so that the product is delivered to the user, just as it would have been had they completed their order through the ecommerce website or application. In another example, the system may provide links to the websites of the local businesses through which the user may complete their purchase of the comparable products. In yet another example, the system may display that the comparable product is in stock at a local business, prompting the user to purchase the product that the local business.

Local businesses may provide product and pricing information to the system via processes the local businesses already have in place for their own e-commerce sites. For example, the local business may provide their product and pricing information to the system via QuickBooks inventory or CSV files that are used to manage inventory at their local stores.

In another aspect, an automated savings system is disclosed that may be used to consolidate a user's credit/debit cards such that when a user makes a purchase the system applies or recommends the use of the credit/debit card that will achieve the greatest amount of rewards points, discount, and/or cashback for the user. This system obviates the need for a user to think about the promotions and offers of each of their cards to determine which card will provide them with the best deal. The system automatically determines the best card to use for the purchase based on the standard rewards of the card and the current promotions/offers associated with each card. In one form, the user provides the name of the business, restaurant, or item they wish to purchase to the system and the system displays the card the user should use to achieve the greatest savings and/or benefit. In another form, the system includes or acts like a credit/debit card that the user uses to complete a purchase. On the backend, the system completes the purchase using the credit/debit card it identifies as providing the greatest savings and/or benefit to the user based on the user's cards associated with the system. Using the system, a user no longer needs to think about which card to use since a single card may be used which maximizes the benefit to the user.

Figure 14:
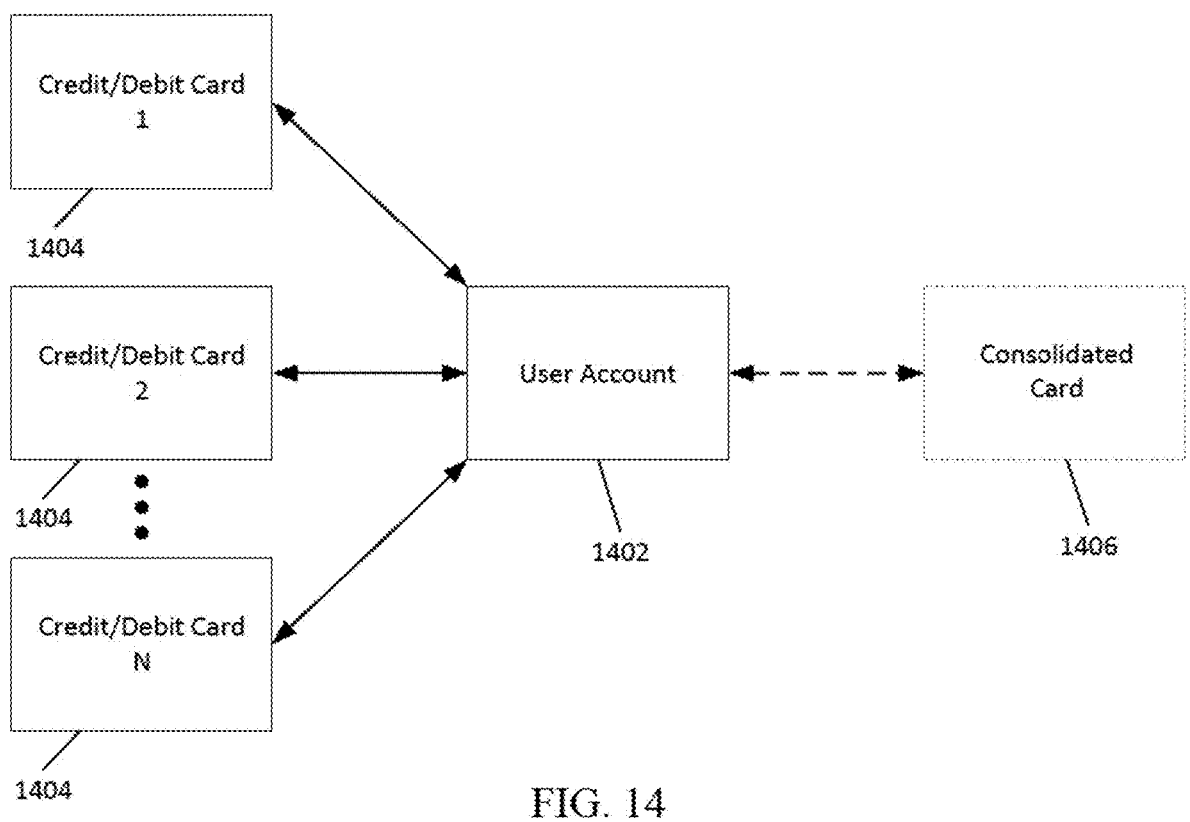
FIG. 14 is an example block diagram of the association of various credit/debit cards to a user account associated with a consolidated card.

The system may be or include a user device running a mobile application, such as a smartphone app. A user may download the app onto their smartphone or tablet. With reference to FIG. 14, the app may prompt the user to create a user account 1402. The app prompts the user to link or associate all of their credit/debit cards 1404 and rewards cards to the application. In one form, a user manually enters the card information into the app. The credit card information may include the credit/debit card provider, the card type, the name on the credit card, the credit card number, and/or card verification value (CVV). The cards may also be linked by uploading photos of the cards to the application. The app may include a feature, such as an icon within the app, that a user selects to take a photo of their card within the app. The app may prompt the user to capture a photo of the front and/or back of each card they wish to associate with the app. The system then processes the image and automatically links each card to the user's account associated with the system. The cards may also be linked to the app by choosing the card from a list displayed to the user within the app. For example, the app may first provide a list of credit/debit card providers to a user. Upon selection of a credit card provider, the app may then provide a list of cards offered by the selected credit card provider for a user to select.

The system may also be or include a web browser extension that the user installs to their web browser, such as a Google Chrome extension. A user may associate their credit/debit cards with the browser extension in a similar manner to that described above in regard to the smartphone app. In another approach, a user may enter account information, such as a username and password, of the user's account they previously setup on their smartphone app or via a website associated with the system. The browser extension may retrieve and display the user's cards that had previously been associated with their user account. Similarly, a user may setup their user account and associate credit/debit cards using the web browser extension and login to their user account via the smartphone app.

In some embodiments, the system includes a consolidated card 1406 that is associated with their user account. The consolidated card 1406 is associated with the credit/debit cards the user associated with their user account. The consolidated card 1406 may be used in place of any of the credit/debit cards 1404, with the system selecting which of the credit/debit cards 1404 will charged based on its analysis of which card provides the best rewards and/or benefits to the user for the transaction. The consolidated card 1406 may be a physical card may be used as a credit/debit card to make purchases. The system, upon receiving notification that a purchase has been made via the physical card, may correspond with the business with which the purchase was made and/or the a credit/debit card provider to complete the purchase transaction using a credit/debit card associated with the user account. The physical card may include a cardholder name and card number that may be entered to complete online transactions.

Additionally and/or alternatively, the consolidated card 1406 may be or include a virtual card that operates via a smartphone app of the system to complete purchases via contactless technologies, for example, near field communication (NFC). Upon making a purchase via the virtual card, the system may complete the purchase using the credit card information of a card associated with the user account. In another form, the system determines the business the user is making a purchase at, determines the best card associated with the user account for completing the purchase and achieving the most savings/benefits for the user, and completes the purchasing using that card's information. The system may determine the business the user is making a purchase at by geolocation, manual entry of the business by the user, and/or communication with the card reader of the business as examples. The system may determine the location of the user based on the location of their smartphone using GPS, Cell ID positioning, and/or a Wi-Fi network a user is connected to.

In embodiments where the system includes a consolidated card 1406, the consolidated card 1406 may be an actual credit/debit card through which a user may complete purchases without the association of another card. The consolidated card 1406 may include its own rewards, discounts, and/cashback offers that it provides to users and takes into consideration when selecting the best card to complete the transaction through. The consolidated card 1406 may be added to virtual wallets such as Apple Pay, Samsung Pay, Google Pay and used to complete purchases.

In use without the consolidated card 1406, the system may recommend which card a user should use to receive the greatest benefit. A user may enter the name of a store, restaurant, business, or item into a search tool of the system. This search may be entered via a user interface of the smartphone application, website, or browser extension of the system. The search may be communicated to a server computer of the system for processing. The system may search the rewards and/or promotional offers for the entered search terms that are associated with each of the cards the user associated with their user account. For example, if the user is purchasing gasoline and a credit card of the user earns 5% cashback on gasoline purchases, the system may recommend the user use that credit card to complete the purchase. As another example where the user is purchasing items from a big box retailer, the system may determine that one or more of the users cards offer an additional discount on goods purchased during that month and recommend the user complete the purchase using that card.

In one illustrative embodiment, a user may enter a search into the system for a place to make a purchase. For example, the user may enter a search for gasoline into a search tool of the smartphone application. The system may process the search request, for example at a server computer associated with the smartphone application and/or browser extension, and may determine which gas stations are nearby and whether any of the user's cards receive a discount or rewards to nearby gas stations. The system may then recommend purchasing gasoline from the gas station that provides the greatest savings/benefits to the user factoring in all card-based benefits. In another form, the system may display the price per gallon at each gas station factoring in all discounts the user will receive by use of a card associated with their user account. If no special promotions are offered, the system may recommend completing the purchase using the credit card that provides the greatest amount of cashback or rewards. Alternatively, a user may select a default card to use when no promotions or offers are available.

In another example, the user may enter a search for "food" or "clothing" into the search tool. The system may return a list of nearby locations with promotions or discounts associated with the cards of the user. In another form, the search is not limited by location but provides a list of restaurants or clothing stores with promotions or discounts for the cards associated with the user's account. The user may then decide to travel to the business to complete the purchase or may complete the purchase online. The system may allow the user to complete the purchase through the smartphone application. In another example, the system provides a link to the website or smartphone application associated with the selected business through which a user may complete a purchase using the card that receives the promotion, discount, and/or rewards.

Figure 15:
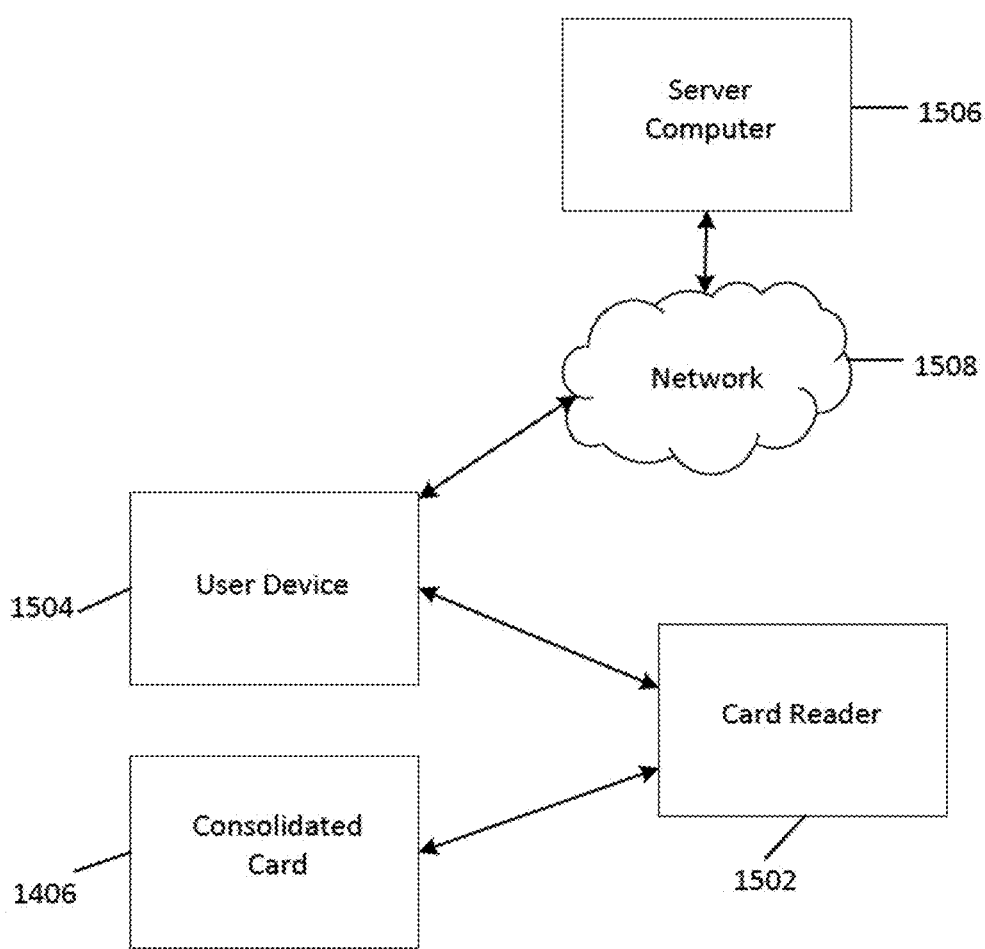
FIG. 15 is a block diagram of an example system using the consolidated card of FIG. 14.

With reference to FIG. 15, in use where a user is using the consolidated card 1406 to complete the purchase transaction, the system completes the purchase for the user on the backend without the user having to search or select which card to use. When using a physical consolidated card 1406, the user swipes, enters, taps, brings near to, or otherwise causes the physical consolidated card 1406 to interact with the card reader 1502. When using a virtual consolidated card 1406, the user uses the virtual consolidated card 1406 by using the NFC features of their user device 1504 running the smartphone application of the system to interact with the card reader 1502. The system then substitutes the provided payment information with the credit card information of the credit/debit card that provides the greatest discount, rewards, and/or cashback for the user. In the example where the user uses the virtual card on their user device 1504 to complete the transaction, the system may provide the credit/debit card information to the card reader of the desired credit/debit card to complete the purchase. This may be complete by communicating with a remote server computer 1506 via a network 1508 such as a cellular network and/or the Internet as examples. The server computer 1506 may be a server computer associated with the smartphone application of the system. The server computer 1506 may determine which credit/debit card of the credit/debit cards 1404 provide the greatest benefit to the user and communicate to the user device 1504 to use that credit/debit card to complete the purchase.

In examples where a physical card is used, the physical card provides the card reader 1502 with the credit card information of the physical card to complete the purchase. After the purchase transaction is complete, the server computer 1506 may receive a communication indicating that the physical card was used to complete a purchase. The system, operating at the server computer 1506, may communicate with the credit/debit card provider of the desired credit/debit card to substitute the desired credit/debit card's payment information. For example, the system may bill the desired credit/debit card and/or pass along the purchase details (e.g., the time of purchase, the location of the purchase, the business, the items purchased, the amount, etc.) to the credit/debit card provider. The user may then receive the savings and/or benefits via that credit/debit card.

In one embodiment where a user is purchasing multiple items, the system may determine that one or more items qualify for a discounts or promotion using one card, while other cards benefit from the user of a different card associated with the user's account. The system may automatically divide the purchase into two or more transactions to apply the discounts/promotions of each card in the purchase of each item. For example, if the user purchases gasoline and a snack at a gas station and a card offers 5% cashback on gasoline purchases, the system may purchase the gasoline using the card offering 5% cashback and the snack using the card the provides the greatest rewards/benefits with no promotions available. When making a purchase online, the browser extension may search the Internet for additional promotional codes for the user to enter before completing the purchase. In another embodiment, when a user is making a purchase online, the system may provide or promote comparable products that may be purchased locally as discussed in relation to FIG. 13.

The system may also allow a user to select which cards to recommend or to use when no promotions are available based on the user's preferences. For example, a user may select within the smartphone app that they would like to receive as much cashback as possible. When the system is determining which card to apply to complete the purchase, the system will recommend or use the card the achieves the most cashback unless other promotions or discounts provide the user with a better deal. As other examples, the user may opt to receive sky miles, rebates/discounts to big box stores. The user may also select to use a certain card as the default when no special promotions or discounts available.

While businesses such as stores and restaurants have often been used as an example in this disclosure, cities, states and/or countries may also provide promotions and offers to users through the system. As an example, cities may incentivize travel to their city or community by providing credits or rebates upon making certain purchases within the city. For example, a city may offer to credit each traveler $50 if they eat at five restaurants within the city limits. As another example, the city may credit a traveler a percentage of the city tax spent during their time within the city.

Figure 16:
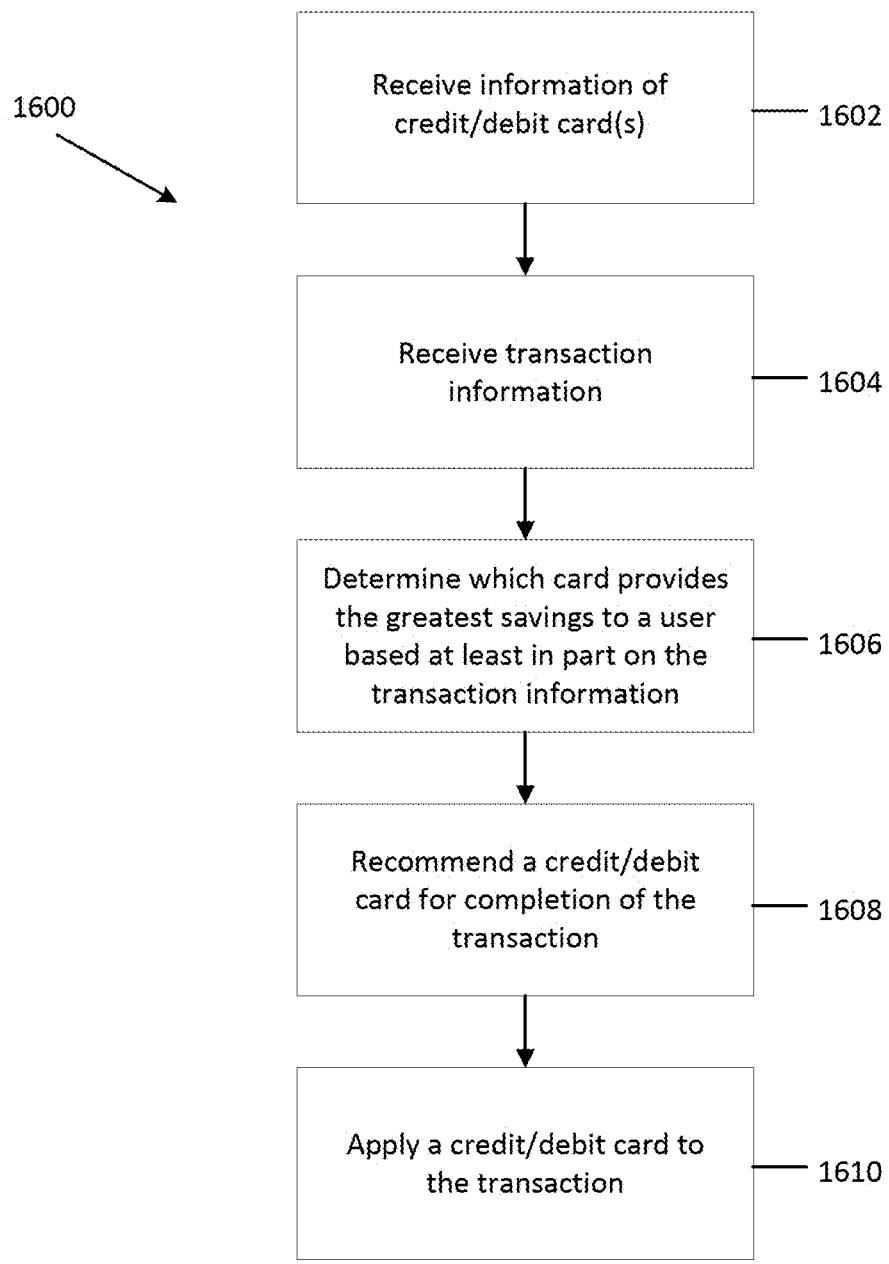
FIG. 16 is a flow diagram of an apparatus, system and/or method for applying a credit/debit card to a transaction.

With reference to FIG. 16, a method 1600 is provided for providing users with a recommendation of which credit/debit card to use or applying a credit/debit card to a transaction that results in the greatest benefit to the user. The system receives 1602 credit/debit card information via a user device. The user device may be a personal computer, tablet, smart speaker, smartphone etc. The system may receive the credit/debit card information by a user submitting a photo of their card, selecting a card from those displayed to the user, receiving audio of a user speaking into a microphone, and/or manually entering the credit/debit card information into the user device. The system then receives 1604 the transaction information. The transaction information may include the time of purchase, the location of the purchase, the business the transaction was made with, the items purchased, the amount, etc. The system may receive the information from the user entering the information into an application or a search tool of the application. The system may also receive the information from the business or credit card processing company once the consolidated card 1406 has been used to complete the transaction. The system then determines 1606 which of the user's credit/debit cards received from the user provide the greatest rewards, cashback, rebate, discount, benefit, etc. based at least in part on the transaction information. This determination may include analyzing the information provided by the card providers regarding their card's rewards program, current promotions, and current discounts. Once a determination has been made, the system may recommend 1608 a credit/debit card for the user to apply to the transaction based on the determination. A user may then use the recommended card to complete the transaction. Alternatively, the system may prompt a user to confirm they would like to proceed using the recommended card. The system may then apply 1610 the recommended card to the transaction. The system may do this by providing the information of the recommended credit card to the card reader, for example, via NFC. Alternatively, where the consolidated card 1406 was used, the system corresponds with the credit card processing company and/or the card provider of the recommended credit/debit card to pass the transaction through the recommended credit/debit card.

Turning now to the smartphone application discussed above, the smartphone application may include a display including home page, a map page, promotion/offers page, a search page, a purchasing page, and/or a rewards page as examples. The home page may display each of the cards a user has associated with their account. The home page may also display one or more promotional offers to the user. The map page may provide an in application map to the user that shows the offers available at each store displayed on the map. The map may automatically display the portion of the map where the user is physically located at to promote the offers of the nearby restaurants, stores, and businesses. The promotions/offers page may provide a list offers and promotions available to the user based on the cards they have associated with their account. The offers and promotions may be listed according to the best deals, biggest discounts, biggest savings, popularity among other users of the app, etc.

The search page may provide a search bar that a user may enter search terms into as described above. For example, if a user desires to purchase clothing, the user may enter "clothing" into the search bar. The application may return one or more clothing stores to the user through which the user may shop for clothing items. The stores displayed to the user may be based on the location of the user to the stores. Alternatively, the stores displayed may be displayed to a user based on promotions or offers available at clothing stores. A user may also enter the name of a business into the search bar to search for promotions or offers available at that business. Promotions and offers displayed to the user may include first time shopper discounts, student discounts, and the like.

The purchasing page may display a default card that will be used for making purchases when a promotion or discount is not available. The purchasing page may display an image of the physical or virtual card provided to a user to make all purchases with, before the system completes the transaction through the desired card. The purchasing page may include a link to a webpage associated with the system of FIG. 13 that a user may use to make local purchases to support their local economy.

The rewards page may include a list of all rewards accounts and cards a user associates with their account. For example, a user may associate a rewards card or account they have with a restaurant. Each time the user makes a purchase from that restaurant using the smartphone app or the physical/virtual card of the system, the system automatically provides the rewards card when making purchase. Thus, a user no longer needs to remember to swipe or scan their rewards card once their card is associated with their user account.

A user may receive notifications via their smartphone app or emails of new offers, discounts, or promotions offered by businesses. In one example, the user receives notifications of these offers based on their location. If a user travels to a new location, the user may receive a notification listing the offers and promotions within that area. The offers and promotions pushed to users may be based on their recent purchases and/or searches. For example, if a user frequently shops for clothing items, the system will notify or email the user of offers or promotions relating to clothing items are available.

The system may also provide the user with a savings summary periodically based on how much the system has saved them. For example, the system may provide a savings report to the user each week, month, and/or year. The savings report may include a graph that indicates to the user how much they spent versus how much they would have spent. The savings report may display a total amount saved using the system.

The system may generate revenue based on the advertisements and promotions that stores, restaurants, and businesses provide to be displayed to users within the application. The businesses may be required to select physical regions where they wish their advertisements to be promoted to users. Businesses may be charged a greater amount to increase the size of the region to which their advertisements are displayed. Businesses may also pay an additional fee to have their name or their advertisements displayed or promoted to users with a greater frequency.

Businesses may also pay a fee to the system each time a purchase is made using the system. For example, the businesses may be required to pay a fee of 1% of the transaction price when a purchase is made using the system or the physical/virtual card associated therewith. Businesses may have their own accounts on the system through which they upload their discounts, promotions, and advertisements. The regions to which a business's offers are displayed along with the frequency of the advertisements may be selected or set via the user account. Businesses may also pay for the display of their offers to users via their user account.

In yet other embodiments, users may associate one or more bank accounts with the system. Users may then select to transfer money from a bank account to another bank account via web browser or smartphone application interface of the system. Users may also send money to other users to pay for items or services digitally. In yet other embodiments, the system provides a platform or page through which a user may purchase and trade stock.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for purchasing goods comprising:
   receiving, from a user device at a processor, a purchase order document listing two or more goods to be purchased by the user in a project, the purchase order document listing a quantity for each of the two or more goods;
   converting, via the processor, the purchase order document into a HTML Document Object Model having a standardized format to create a converted document;
   parsing the converted document for product information about the two or more goods including:
      looping through the converted document to identify document information based on pixel positions of objects in the converted document;
      comparing the pixel positions of the identified document information to identify rows and/or columns of the converted document to identify other document information of the converted document;
      identifying labels of the converted document indicating a type of data of associated document information; and
      extracting the product information about the two or more goods from the identified document information;
   determining, via the processor, identifying information of the two or more goods based at least in part on the product information parsed from the converted document;
   acquiring, via the processor, prices for the two or more goods from a plurality of sellers based at least in part on the identifying information;
   acquiring, via the processor, at least one price for a comparable good from at least one seller;
   outputting to a user interface of the user device a bid including a bid price for purchasing the two or more goods of the purchase order document based at least in part on the acquired prices with an option to accept the bid to purchase each of the two or more goods at the bid price; and
   facilitating purchase of the two or more goods of the purchase order document at the bid price in response to receiving a selection at the user interface to accept the bid.

2. The method of claim 1 wherein acquiring prices includes crawling the internet for prices.

3. The method of claim 1 wherein acquiring prices includes searching a database of stored prices.

4. The method of claim 1 wherein the purchase order document is an uploaded document.

5. The method of claim 4 wherein converting the purchase order document into a standardized format includes standardizing the spacing of information of the purchase order document.

6. The method of claim 1 wherein acquiring prices includes acquiring a bulk price for at least one of the two or more goods based on identifying information from a plurality of users, wherein the identifying information includes quantity.

7. The method of claim 1 further including sending information pertaining to the two or more goods to a sales representative and acquiring prices from the sales representative.

8. The method of claim 1 wherein acquiring at least one price for a comparable good includes generating a price for a house brand comparable good based on the acquired prices for the good.

9. The method of claim 1 wherein receiving the purchase order document includes monitoring emails for attachments.

10. The method of claim 1 further comprising acquiring at least one price from a local store.

11. The method of claim 1 further comprising outputting an invoice.

12. The method of claim 11 wherein the invoice is of a format compatible with a bookkeeping software.

13. The method of claim 1 further comprising retrieving, via the processor, historical pricing data for the two or more goods or the comparable good from a historical pricing database and further outputting to the user interface of the user device the historical pricing data along with the bid to provide context for the bid price.

14. A non-transitory storage medium storing a computer program executable by a processor-based system, the computer program causing the processor-based system to execute steps comprising:
   receiving from a user device a purchase order document listing two or more goods to be purchased by the user, the purchase order document listing a quantity for each of the two or more goods;
   converting the purchase order document into a HTML Document Object Model having a standardized format to create a converted document;
   parsing the converted document for product information about the two or more goods including:

looping through the converted document to identify document information based on pixel positions of objects in the converted document;

comparing the pixel positions of the identified document information to identify rows and/or columns of the converted document to identify other document information of the converted document;

identifying labels of the converted document indicating a type of data of associated document information; and extracting the product information about the two or more goods from the identified document information;

determining identifying information of the two or more goods based at least in part on the product information parsed from the converted document;

acquiring prices for the two or more goods from a plurality of sellers based at least in part on the identifying information;

acquiring at least one price for a comparable good from at least one seller;

outputting to a user interface of the user device a bid including a bid price for purchasing the two or more goods of the purchase order document based at least in part on the acquired prices with an option to accept the bid to purchase each of the two or more goods at the bid price; and facilitating purchase of the two or more goods of the purchase order document at the bid price in response to receiving a selection at the user interface to accept the bid.

15. The non-transitory storage medium of claim 14, the step of acquiring prices further includes crawling the internet for prices.

16. The non-transitory storage medium of claim 14, the step of acquiring prices further includes searching a database of stored prices.

17. The non-transitory storage medium of claim 14, wherein the purchase order document is an uploaded purchase order document.

18. The non-transitory storage medium of claim 14, wherein the purchase order document is an uploaded document and the step of converting the purchase order document to the HTML Document Object Model having a standardized format includes standardizing the spacing of the uploaded purchase order document.

19. The non-transitory storage medium of claim 14, the steps further comprising monitoring emails for attachments.

20. The method of claim 13 wherein retrieving historical pricing data for the two or more goods includes searching at least one of caches of prior webpages and prior price information.

21. The method of claim 1 further comprising outputting project information along with the bid that is related to the project, the output project information being filtered based at least in part on a role of the user in the project, wherein outputting the project information along with the bid includes presenting a message via the user interface indicating a good of the two or more goods of the purchase order document is incompatible with the project.

22. The method of claim 1 further comprising outputting project information along with the bid that is related to the project, the output project information being filtered based at least in part on a role of the user in the project, wherein outputting the project information along with the bid includes presenting information pertaining to a specific good of the two or more goods on the bid.

23. The method of claim 1 wherein facilitating purchase of the two or more goods of the purchase order document includes facilitating purchase of the two or more goods from at least two sellers.

\* \* \* \* \*